(12) United States Patent
Zhang et al.

(10) Patent No.: US 11,806,303 B2
(45) Date of Patent: Nov. 7, 2023

(54) ROBOTIC WALKING ASSISTANT

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: ChengKun Zhang, Temple City, CA (US); Luis Alfredo Mateos Guzman, San Gabriel, CA (US); Houzhu Ding, San Gabriel, CA (US); Zhen Xiu, Chino Hills, CA (US); Huan Tan, Pasadena, CA (US)

(73) Assignees: UBTECH NORTH AMERICA RESEARCH AND DEVELOPMENT CENTER CORP, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 395 days.

(21) Appl. No.: 17/359,672

(22) Filed: Jun. 28, 2021

(65) Prior Publication Data

US 2022/0409468 A1    Dec. 29, 2022

(51) Int. Cl.
*A61H 3/04*  (2006.01)
*G05D 1/02*  (2020.01)
*G05D 1/00*  (2006.01)

(52) U.S. Cl.
CPC .............. *A61H 3/04* (2013.01); *G05D 1/0088* (2013.01); *G05D 1/0231* (2013.01); *A61H 2003/043* (2013.01); *A61H 2201/1635* (2013.01); *A61H 2201/1659* (2013.01); *A61H 2201/5007* (2013.01); *A61H 2201/5092* (2013.01); *A61H 2203/0406* (2013.01); *A61H 2203/0425* (2013.01)

(58) Field of Classification Search
CPC ................ A61H 3/04; A61H 2003/043; A61H 2201/1635; A61H 2201/1659; A61H 2201/5007; A61H 2201/5092; A61H 2203/0425; G05D 1/0088; G05D 1/0231
See application file for complete search history.

(56) References Cited

U.S. PATENT DOCUMENTS

| | | | |
|---|---|---|---|
| 2012/0018233 A1* | 1/2012 | Chang ...................... | A61G 5/06 180/19.2 |
| 2018/0116898 A1* | 5/2018 | Morbi .................. | A61G 7/1019 |
| 2020/0008990 A1* | 1/2020 | Harrison ................ | B62K 5/025 |
| 2022/0019961 A1* | 1/2022 | Johnson ............... | G05D 1/0225 |
| 2022/0183920 A1* | 6/2022 | Raja .......................... | A61H 3/04 |
| 2022/0409468 A1* | 12/2022 | Zhang .................. | G05D 1/0231 |
| 2022/0409469 A1* | 12/2022 | Shen ................... | A63B 21/0058 |
| 2023/0136051 A1* | 5/2023 | Sullivan .................. | A61H 3/04 135/75 |

* cited by examiner

*Primary Examiner* — Erez Gurari

(57) ABSTRACT

A robotic walking assistant includes a wheeled base having a base and one or more position adjustable wheels connected to the base, a body disposed in a vertical direction, positioned on the wheeled base and having a handle, and a control system that receives command instructions. Each of the one or more wheels is slidable with respect to the base between a retracted position and an extended position in a direction that is substantially parallel to a surface where the wheeled base moves. In response to the command instructions, the control system moves the one or more wheels between the retracted positions and the extended positions.

20 Claims, 17 Drawing Sheets

ROBOTIC WALKING ASSISTANT

TECHNICAL FIELD

The present disclosure generally relates to robots, and particularly to a smart robotic walking assistant that can provide walking assistance, walking training, and fall prevention.

BACKGROUND

Walking is one of the most important abilities that enable people to remain independent and healthy throughout their lives. Unfortunately, there are numerous people who lose their walking ability because of accidents or diseases. As society ages, the number of seniors who suffer from walking dysfunctions grows rapidly. Additionally, older people have the highest risk of death or serious injury arising from a fall and the risk increases with age.

Recent advances in robotics provide an innovative solution to alleviate these challenges by improving elderly quality of life and prioritizing their dignity and independence. As such, robotic walking assistants have attracted significant attention in recent years. One type of a robotic walking assistant can be designed to help support a portion of the user's bodyweight to reduce the load on the user's legs while walking, leading to reduced fatigue and less physical exertion. For example, robotic walking assistants typically include wheels for movement and a vertical body having handles that allow users to push the robotic walking assistants while walking.

However, because of the fixed nature of the wheels and the vertical body, these robotic walking assistants may suffer from lack of sufficient stability when they provide a seat that allows users to sit on. In addition, these robotic walking assistants may suffer from the problem that people with a large stride tend to kick the back of the robotic walking assistants while walking.

Therefore, there is a need to provide a robotic walking assistant to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
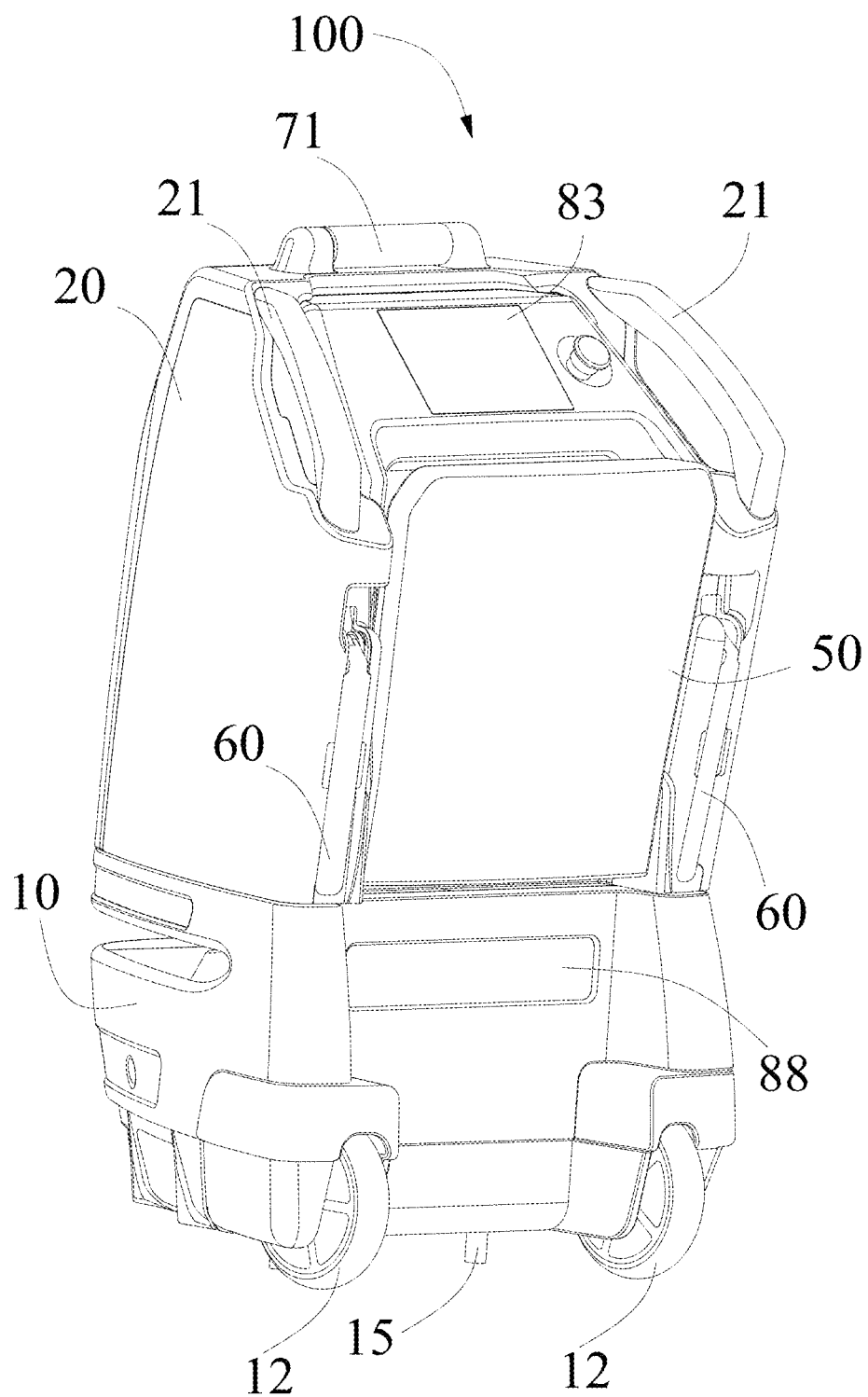
FIG. 1 is a schematic isometric view of a robotic walking assistant according to one embodiment of the present disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 2:
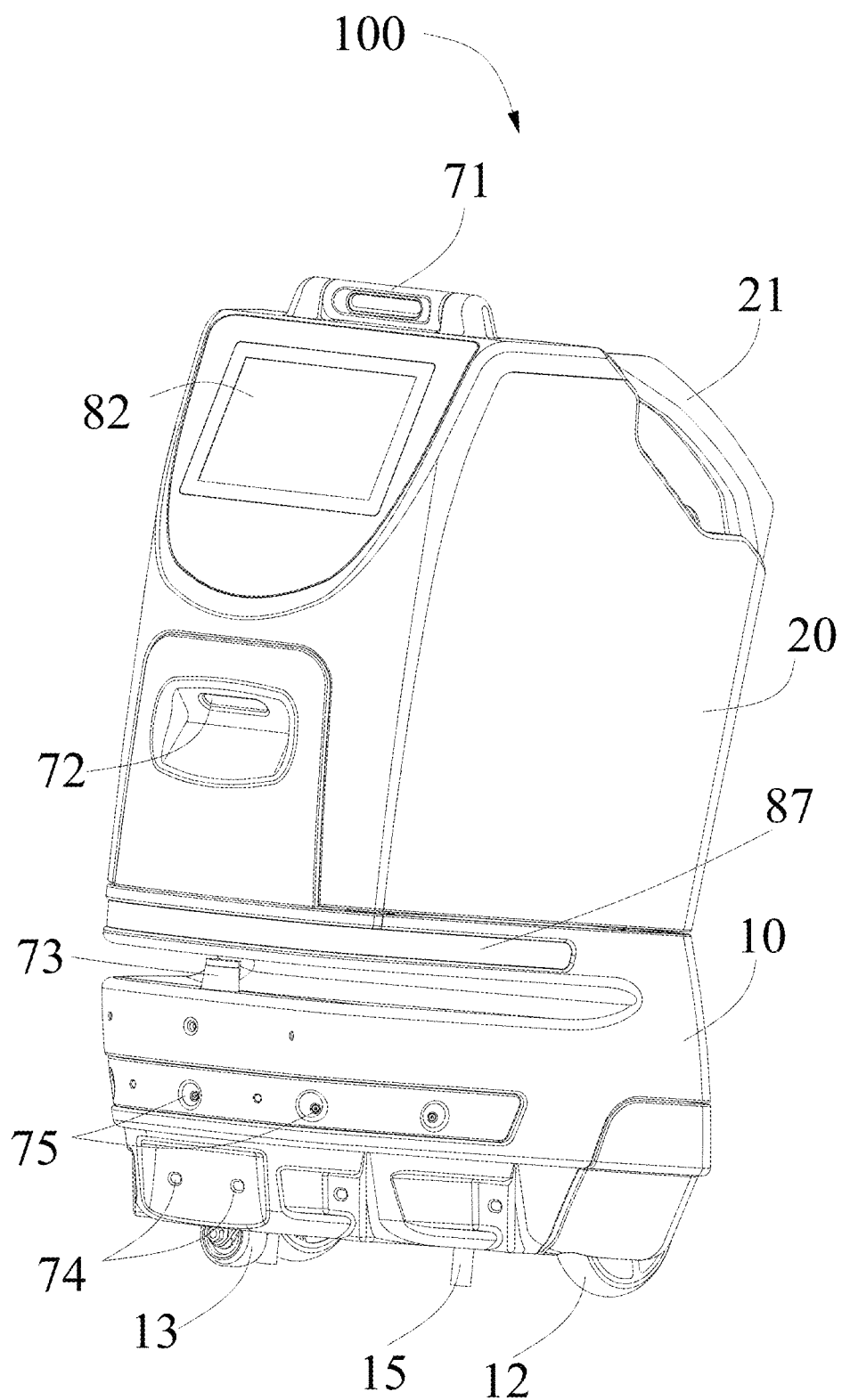
FIG. 2 is a schematic isometric view of the robotic walking assistant viewed from a different perspective.

FIGS. 1 and 2 are isometric views of a robotic walking assistant 100 that can help support a portion of a user's bodyweight to reduce the load on the user's legs when the user (e.g., a care seeker or a patient) is walking. The robotic walking assistant 100 can provide support/guide to people during their walking, so that they can maintain balance and walk safely. In one embodiment, the robotic walking assistant 100 may be employed in facilities, such as a healthcare facility, an elderly care facility, an assisted living facility, and the like, to assist senior people when they are walking. However, the robotic walking assistant 100 may be employed in other facilities. For example, the robotic walking assistant 100 may be employed in hospitals to provide walking assistance, walking training, and fall prevention to people who temporarily lose their walking ability because of accidents or diseases.

In one embodiment, the robotic walking assistant 100 may include a wheeled base 10, a body 20 positioned on the wheeled base 10, an elevation mechanism 30 (see FIG. 8) positioned on the wheeled base 10, and a control system 40 (see FIG. 11) that receives command instructions from a host computer and a graphic user interface (GUI) displayed on displays 82 and 83 to allow users (e.g., healthcare professionals and care seekers) to directly control the robotic walking assistant 100. In response to the command instructions, the control system 40 controls movement of the wheeled base 10, the elevation mechanism 30, and/or other mechanical or software aspects of the robotic walking assistant 100. In one embodiment, the elevation mechanism 30 may be omitted.

Figure 3:
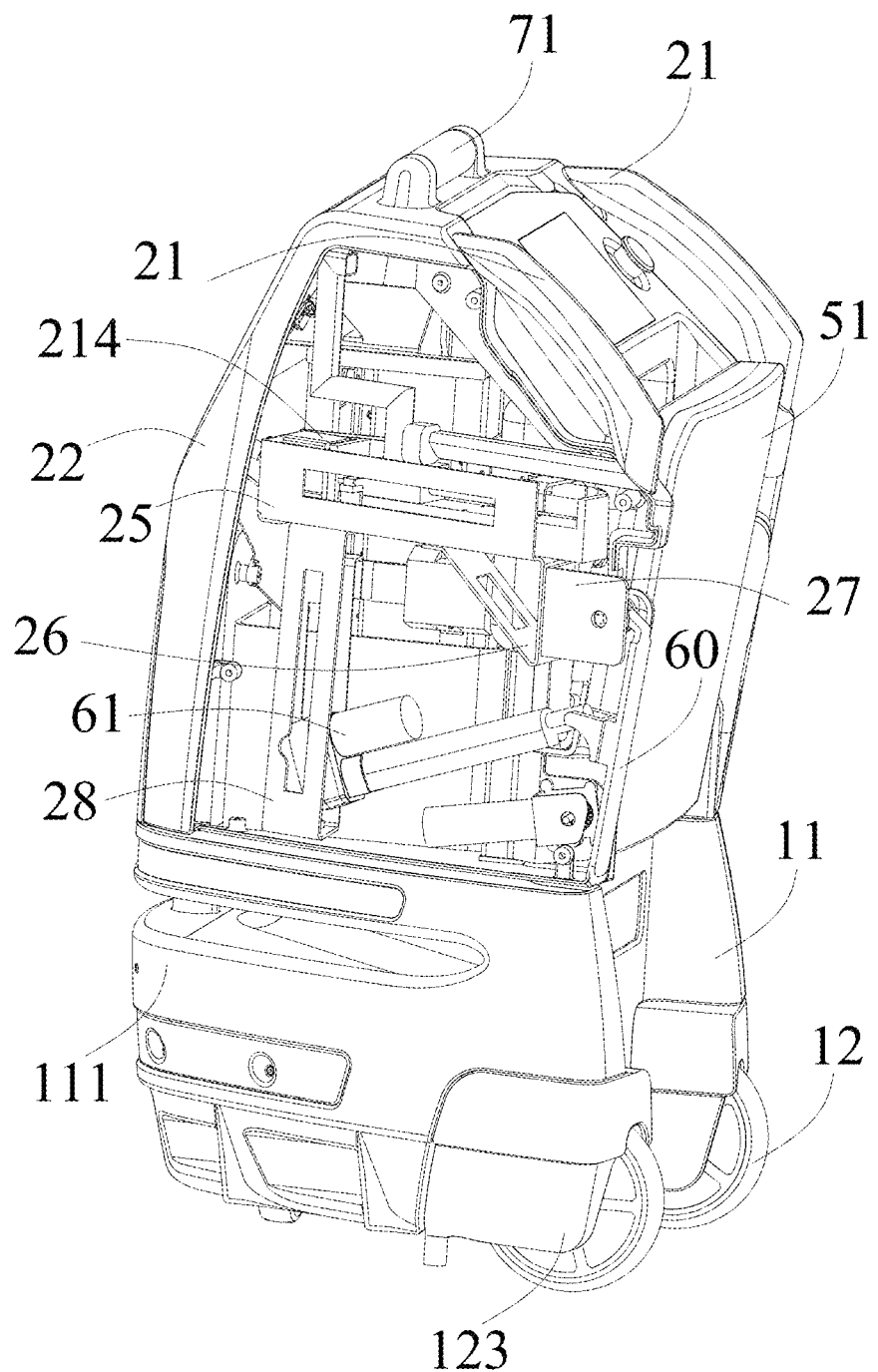
FIG. 3 is a schematic isometric view of the robotic walking assistant, with a side cover of the robotic walking assistant omitted.

With reference to FIG. 3, the wheeled base 10 provides a movement mechanism for the robotic walking assistant 100 to go from location to location. In one embodiment, the wheeled base 10 includes a base 11, two differentially driven wheel mechanisms 12, and one or more other wheels that are connected to the base 10. The wheel mechanisms 12 allow for movement of the wheeled base 10 along a desired path, while the one or more other wheels allow for balance and stability of the wheeled base 10. The one or more other wheels may be castor wheels or omni-directional driving wheels. In one embodiment, each wheel mechanisms 12 is slidable with respect to the base 11 between a retracted position (see FIG. 8) and an extended position (see FIG. 8) in a direction that is substantially parallel to a surface (e.g., floor) where the wheeled base 10 moves. Further description of the wheeled base 10 is provided below.

In one embodiment, the body 20 is positioned on the top of the wheeled base 10 and disposed in a vertical direction. The body 20 includes at least one handle 21. A user may hold the at least one handle 21 while walking/standing, which allows the robotic walking assistant 100 to provide an upward support force to the user, thereby helping the user to maintain balance during his/her walking/standing. The robotic walking assistant is like a walking cane with the at least one handle 21, which can ensure stability of the walking of a user.

Figure 8:
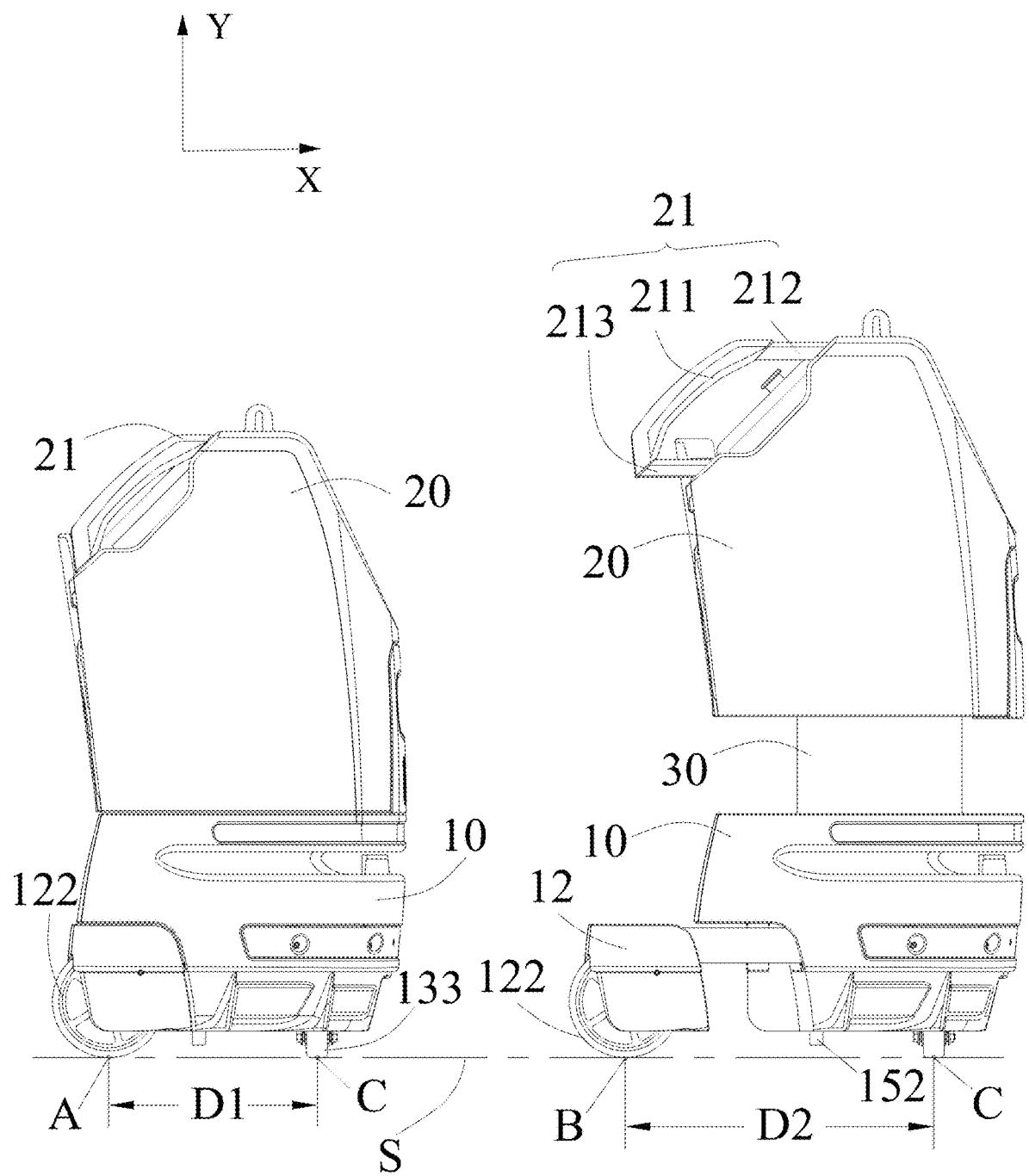
FIG. 8 are planar views showing the robotic walking assistant in two different states.

In one embodiment, the elevation mechanism 30 is connected between the wheeled base 10 and the body 20. Referring to FIG. 8, via actuation of the elevation mechanism 30, the body 20 can move up and down in a vertical direction as indicated by the y-axis between a retracted position and an extended position. In the retracted position, the elevation mechanism 30 enables the robotic walking assistant 100 to have a limited height, which facilitates stability during movement and travel of the robotic walking assistant 100. The elevation mechanism 30 can be actuated to adjust the robotic walking assistant 100 to different heights so that the robotic walking assistant 100 can have the flexibility to adapt to users of different heights. Further description of the elevation mechanism 30 is provided below.

In one embodiment, the robotic walking assistant may include sensors that enable the robotic walking assistant 100 to perceive the environment where the robotic walking assistant 100 operates. In one embodiment, the sensors may include ranging sensors that require no physical contact with objects being detected. They allow the robotic walking assistant 100 to perceive an obstacle without actually having to come into contact with it. As shown in FIG. 2, the ranging sensors may include infrared (IR) sensors 74, ultrasonic sensors 75, one or more light detection and ranging (LiDAR) sensors 73, near field communication (NFC), and RFID sensors/readers. In one embodiment, the sensors may include inertial measurement unit (IMU) sensors and a camera 72. Each IMU sensor incorporates at least one accelerometer and at least one gyroscope. The one or more LiDAR sensors 73 are used to create an environment map. In combination with the IMU sensors 76, the LiDAR sensors 73 are used to determine a real-time position of the robotic walking assistant 100 in the environment map. Data from the ranging sensors and the camera 72 are used to detect obstacles, such as bumps, over-hanging objects, spills, and other hazards during movement of the robotic walking assistant 100, and the robotic walking assistant 100 can alert the user to bypass the detected obstacles. These sensors can be positioned along the wheeled base 10 or other positions of the robotic walking assistant 100. Further description of the sensors is provided below.

The control system 40 (see FIG. 11) is electronically connected to the wheeled base 10, the elevation mechanism 30, and the sensors, and is configured to receive command instructions to control the robotic walking assistant 100. The command instructions can be received from the control system 40 in response to movement/action of the robotic walking assistant 100, or the control system 40 can receive command instructions from a host computer either wirelessly or through a wired connection, or through the GUI on the displays 82 and 83. The control system 40 can also receive command instructions directly from a user. For example, the robotic walking assistant 100 can detect whether the handles 21 are held by a user. In some modes, the control system 40 receives a command instruction after a user holds the handles 21. In response to the command instructions, the control system 40 controls movement of the wheeled base 10, and controls the elevation mechanism 30 to actuate movement of the body 20. Further description of the control system 40 is provided below.

The wheeled base 10 may be a differential drive platform, in one example. With reference to FIGS. 1 and 2, in one embodiment, the wheeled base 10 includes two independently actuated driven wheel mechanisms 12 and one castor wheel mechanisms 13. The two wheel mechanisms 12 are spaced apart from each other and arranged at opposite sides of the wheeled base 10, with their rotation axes aligned with each other and extending along a widthwise direction of the wheeled base 10. The castor wheel mechanism 13 can include an omni-directional wheel and is arranged adjacent to one end of the wheeled base 10 opposite the wheel mechanisms 12. It should be noted that the number and arrangement of the wheel mechanisms 12 and castor wheel mechanism 13 may change according to actual needs. For example, in an alternative embodiment, two wheel mechanisms 12 and two castor wheel mechanisms 13 may be respectively arranged at four corners of the wheeled base 10.

In one embodiment, the base 11 may include a base body 110 (see FIG. 4) and a base casing 111 (sec FIG. 3) that surrounds and is connected to the base body 110. Referring to FIGS. 5 and 6, the base body 110 may include bottom plate 112 and a number of support bars protruding from the bottom plate 112. In one embodiment, each wheel mechanism 12 may be movably connected to the base body 110 by one linear actuator 14. The linear actuators 14 are respectively fixed to two support bars 113a at one end of the bottom plate 112. The linear actuator 14 includes a motor 141, a tube 142, and an output shaft 143 that is slidably connected to the tube 142. Via actuation of the motor 141, the output shaft 143 can slide with respect to the tube 142.

The wheel mechanisms 12 are respectively connected to the distal ends of the output shafts 143. In the embodiment, each output shaft 143 (see FIG. 6) extends in a direction that is inclined with respect to the moving direction M (see FIG. 5) of the wheeled base 10 and parallel to a surface S (see FIG. 5) where the wheeled base 10 moves. The moving direction M here refers to the travelling direction of the wheeled base 10 moving along a straight line. In response to a command instruction, the control system 40 can control the motors 141 to actuate the linear movement of the output shafts 143, which allows the wheel mechanisms 12 to move with respect to the wheeled base 10 between the retracted position (see FIG. 8) and the extended position (see FIG. 8) in directions $L_1$ and $L_2$ (see FIG. 5) that are substantially parallel to the surface S where the wheeled base 10 moves. As shown in FIG. 5, the directions $L_1$ and $L_2$ are inclined outwardly with respect to the moving direction M of the wheeled base 10.

Figure 7:
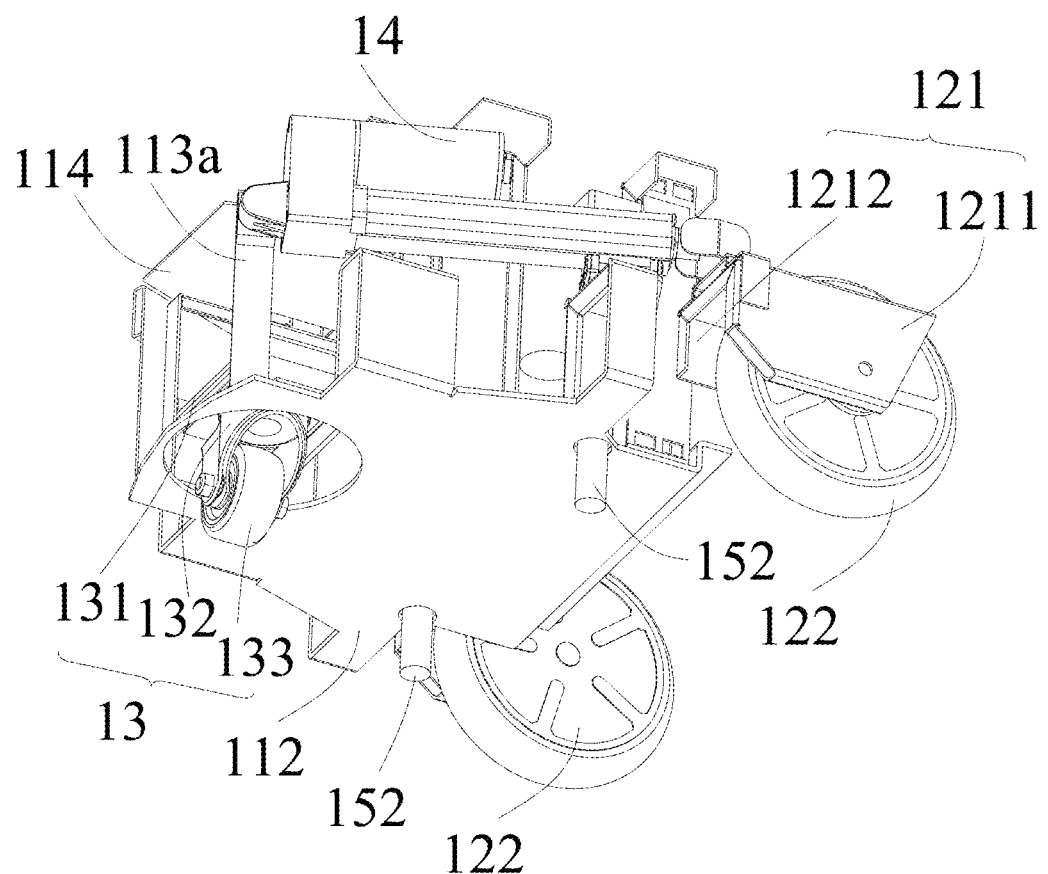
FIG. 7 is a schematic isometric view showing inside structures of the wheeled base of the robotic walking assistant, viewed from a different perspective.

Referring to FIG. 7, in one embodiment, each wheel mechanism 12 may include a wheel mounting member 121, a wheel 122 rotatably connected to the wheel mounting member 121, and a wheel shield 123 (see FIG. 3) fixed to the wheel mounting member 121. The wheel mounting member 121 may include two vertical plates 1211 and 1212 that are spaced apart from and connected to each other. The two vertical plates 1211 and 1212 define a space in which the wheel 122 rotates. In one embodiment, the wheel 122 may be rotatably connected to the plate 1211, and a motor can be arranged within the wheel 122 and configured to drive the wheel 122 to rotate. The motors within the wheel 122 may be electrically coupled to the control system 40. In combination with the control system 40, the sensors, and the motors, the robotic walking assistant 100 can operate in an autonomous mode and move autonomously along a determined path. The castor wheel mechanisms 13 may include a fixing member 131 fixed to the bottom of the bottom plate 112 of the base 11, a wheel mounting member 132 that is connected to the fixing member 131 and rotatable about a substantially vertical axis, and a wheel 133 that is connected to the wheel mounting member 132 and rotatable about a substantially horizontal axis. With such arrangement, the wheel 133 has two degrees of freedom, and can thus align itself to the direction of travel. In one embodiment, each of the wheel mechanisms 12 and 13 may include a suspension system that allows for smoother traveling over small gaps, carpet, mats, and imperfections of a floor. Each suspension system may include springs and/or dampers. The springs allow the wheels 122 and 133 to move up to absorb bumps and reduce jolting, while the dampers prevent bouncing up and down. Various suspension systems have been brought into market and proposed in many publications, which will not be repeated here.

When the two wheels 122 and the wheel 133 are in contact with the surface S, three support points are formed between the wheels 122, 133 and the surface S. For example, when the wheel mechanisms 12 are in the retracted positions, two support points A (see FIGS. 6 and 8) are formed between the wheels 122 and the surface S, and a support point C (see FIG. 8) is formed between the wheel 133 and the surface S. When the wheel mechanisms 12 are in the extended positions, two support points B (see FIG. 8) are formed between the wheels 122 and the surface S. That is, different sets of support points (e.g., a first set of support points A and C and a second set of support points 13 and C) can be formed between the wheels 122, 133 and the surface S because the wheels 122 can move with respect to the base 11.

Since the wheels 122 can move with respect to the base 11, the distances between the wheels 122, 133 are adjustable. Specifically, as shown in FIG. 8, the distance between each of the wheels 122 and the wheel 133 can be increased from D1 to D2 by moving the wheels 122 from the retracted positions to the extended positions. Since the output shafts 143, to which the wheel mechanisms 12 are connected, extend in a direction that is inclined with respect to the moving direction M (see FIG. 5) of the wheeled base 10, the wheels 122 are slidable with respect to the base 11 along a direction that is inclined outwardly with respect to the moving direction M of the wheeled base 10. As a result, the distance D3 (see FIG. 6) between the two wheels 122 increases after the wheels 122 moves from the retracted positions to the extended positions. Accordingly, the three sides of the supporting polygon (i.e., a triangle) formed by connecting the three support points between the wheels 122, 133 and the surface S increase when the wheels 122 moves from the retracted positions to the extended positions. As a result, the supporting polygon formed by connecting the support points B and C has an area larger than the supporting polygon formed by connecting the support points A and C.

The robotic walking assistant 100 as described in embodiments above is a machine that stands on a triangular footprint and has an adjustable height. When the body 20 moves up and down or the robotic walking assistant 100 supports a portion of the bodyweight of a user pushing the robotic walking assistant 100 or sitting on a seat (which will be described later) of the robotic walking assistant 100, the center of gravity of the robotic walking assistant 100 is shifted. However, as long as the center of gravity of the robotic walking assistant 100 remains oriented inside the supporting polygon formed by connecting the three support points between the wheels 122, 133 and the surface S, the robotic walking assistant 100 remains upright and will not tip over. Although the center of gravity of the robotic walking assistant 100 moves when the body 20 moves up or a user sits on the seat of the robotic walking assistant 100, the supporting polygon formed by connecting the three support points between the wheels 122, 133 and the surface S has a larger area after the wheels 122 moves from the retracted positions to the extended positions, and the center of gravity of the robotic walking assistant 100 can still fall within the confines of the supporting polygon. Additionally, when the wheels 122 are moved to their extended positions, the distance between a user supported by the robotic walking assistant and the back of the robotic walking assistant 100 is increased, compared to when the wheels 122 are moved to their retracted positions, which can prevent a user with a large stride from kicking the back of the robotic walking assistant 100.

Referring to FIGS. 6 and 7, in one embodiment, the wheeled base 10 further includes one or more actuated feet 15 that are connected to the base 11. In one embodiment, the number of the actuated feet 15 may be two. Each actuated foot IS includes a motor 151 (e.g., a linear motor) fixed to a vertical bar 113b protruding from the bottom plate 112 of the base 11 and a foot 152 that is driven by the motor 151 and movable in a vertical direction between a retracted position (see FIG. 8) and an extended position (see FIG. 2). During movement of the wheeled base 10, the feet 152 are controlled by the control system 40 to move up to their retracted positions. When a user sits on the seat of the robotic walking assistant 100, the feet 152 are controlled by the control system 40 to move down to their extended positions and come into contact with the surface S. In this case, in addition to the three support points provided by the wheels 122 and 133, the feet 152 provide two additional support points for the robotic walking assistant 100. Since the feet 152 can be made to have greater support polygons than the wheels 122 and 133, the robotic walking assistant 100 can thus have increased static stability, which helps the robotic walking assistant 100 to remain upright with increased stability when a user sits on the seat of the robotic walking assistant 100.

Figure 4:
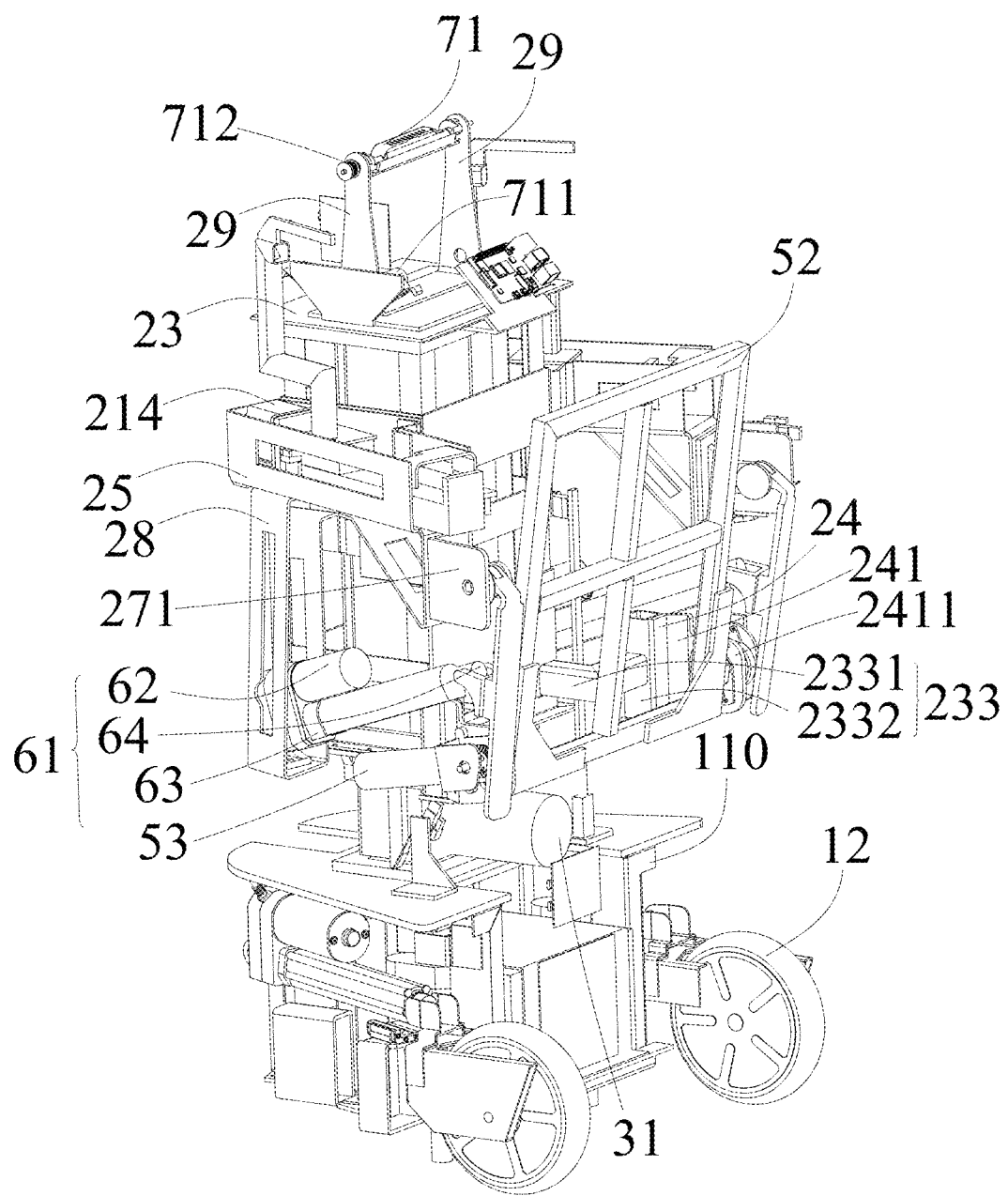
FIG. 4 is a schematic isometric view showing inside structures of the robotic walking assistant.
Figure 5:
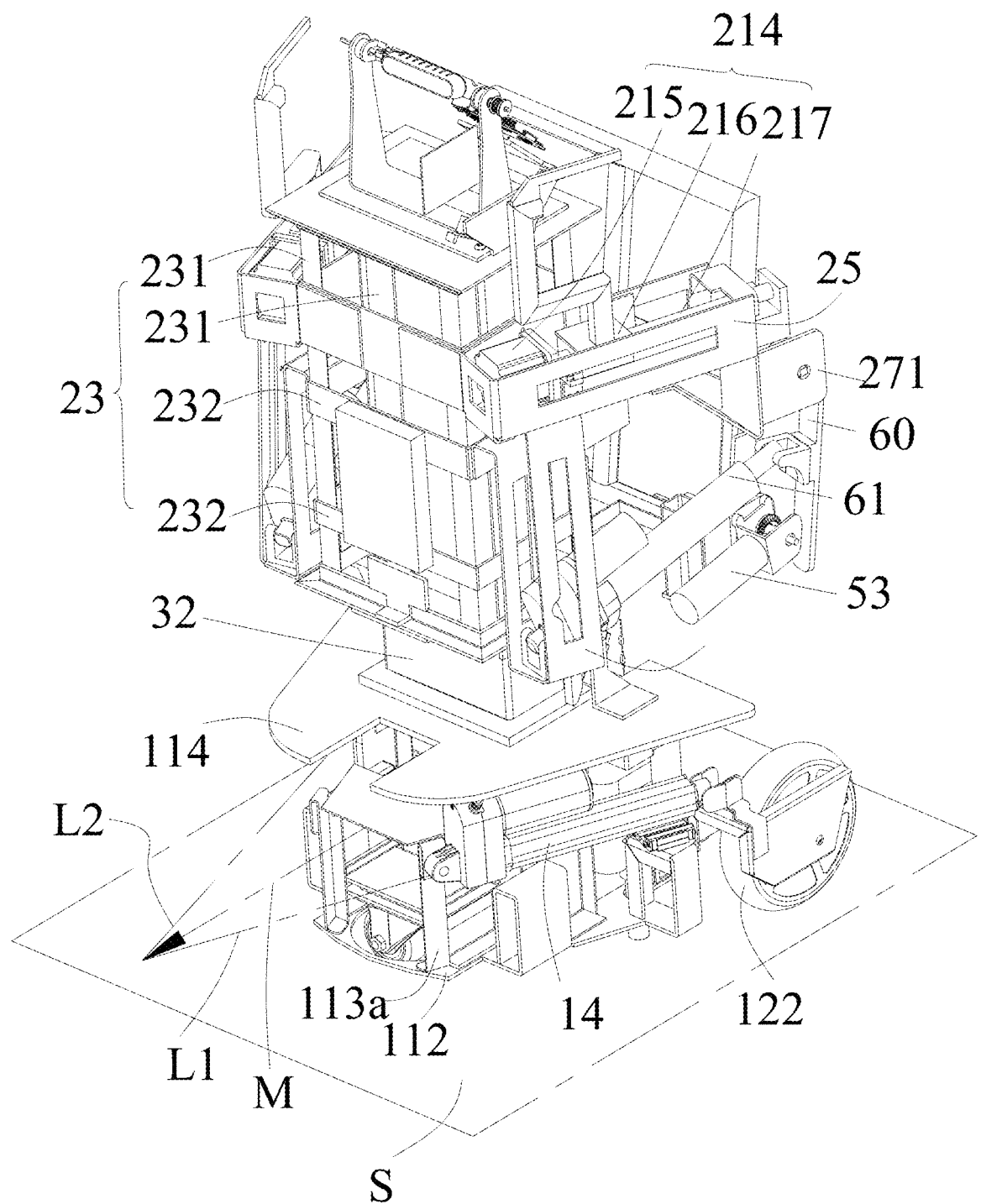
FIG. 5 is a schematic isometric view showing inside structures of the robotic walking assistant, viewed from a different perspective.
Figure 6:
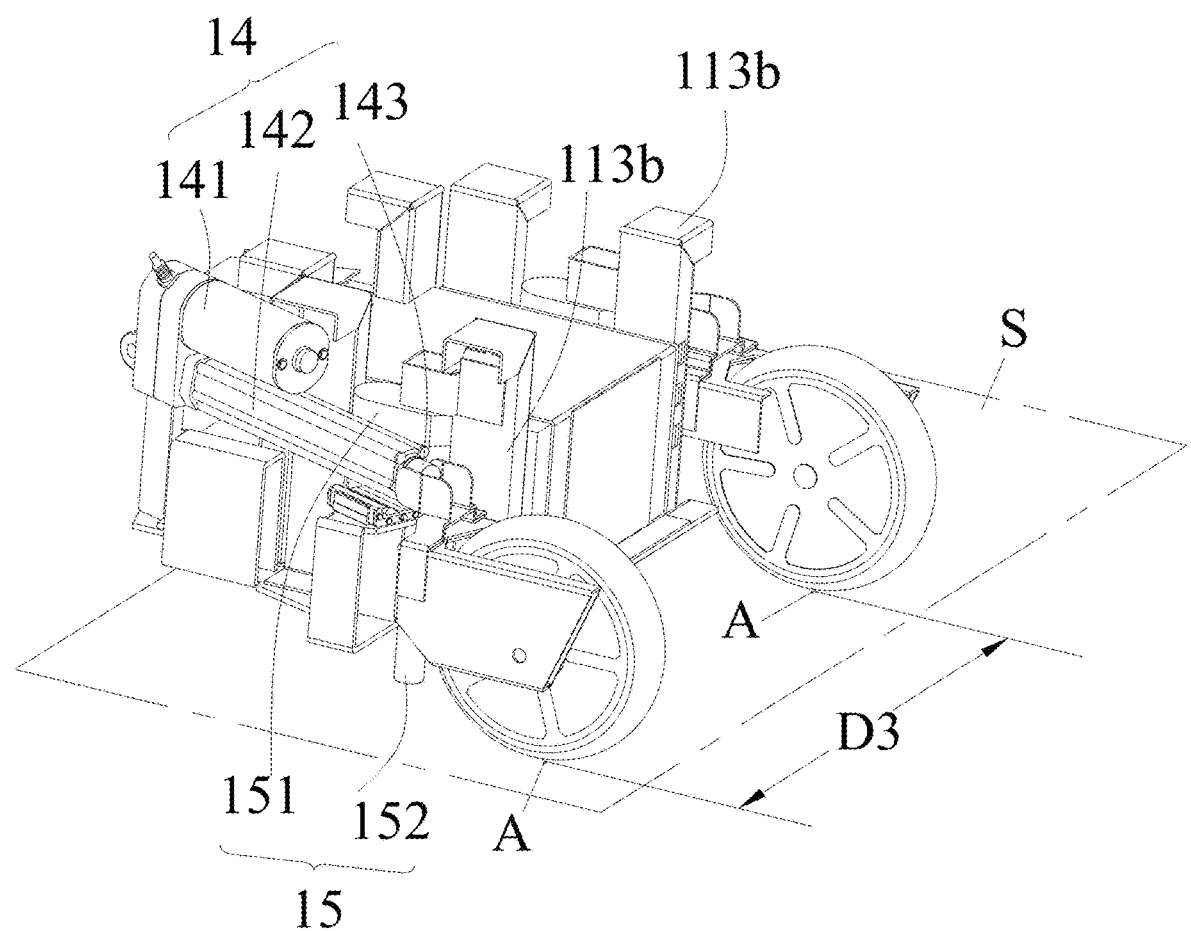
FIG. 6 is a schematic isometric view showing inside structures of a wheeled base of the robotic walking assistant.

Referring to FIGS. 4, 5, and 8, in one embodiment, the elevation mechanism 30 includes a motor 31 and a lifting mechanism 32. The body 20 is coupled to the lifting mechanism 32, and the motor 31 is configured to drive the lifting mechanism 32 to elongate or retract in the vertical direction. The motor 31 may be a linear actuator configured to apply a pushing force or a pulling force to the lifting mechanism 32 to drive the lifting mechanism 32 to elongate or retract in the vertical direction. In one embodiment, the lifting mechanism 32 may include a lead screw that is coupled to the output shaft of the motor 31, and a threaded collar that is coupled to and slidable along the lead screw. By engagement of the threaded collar with the lead screw, rotary motion from the motor 31 is converted into translational motion. The elevation mechanism 30 can then drive the body 20 to move up and down. In another embodiment, the lifting mechanism 32 may be a scissor lift mechanism. Specifically, the lifting mechanism 32 includes one or more pairs of supports and that are rotatably connected to one another and each pair of supports and form a crisscross "X" pattern. The arrangement of these pairs of supports and is well known and will not be described in detail here. It should be noted that the lead screw and threaded collar, and the scissor lift mechanism are just examples of the lifting mechanism 32. The lifting mechanism 32 may be of other configurations according to actual needs.

Figure 9:
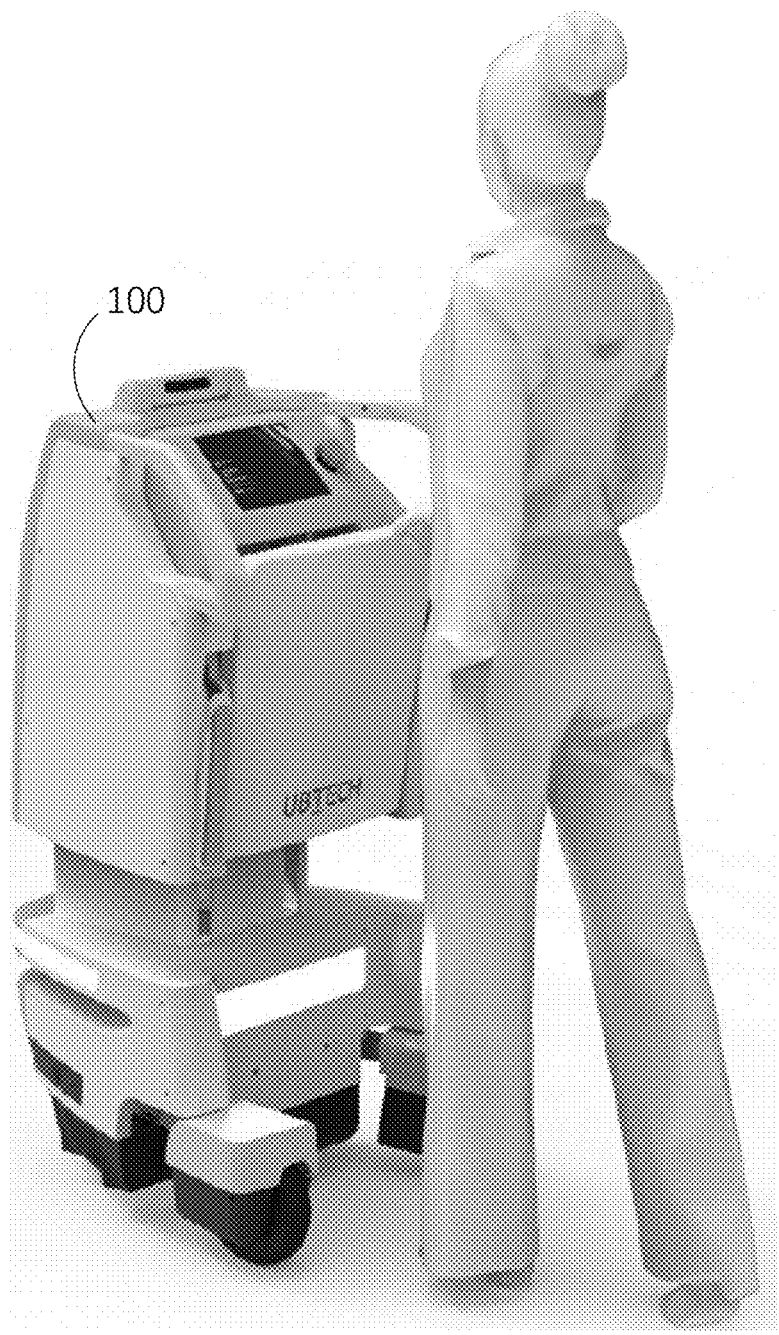
FIG. 9 is a schematic diagram showing the robotic walking assistant in a walking assistive mode.
Figure 10:
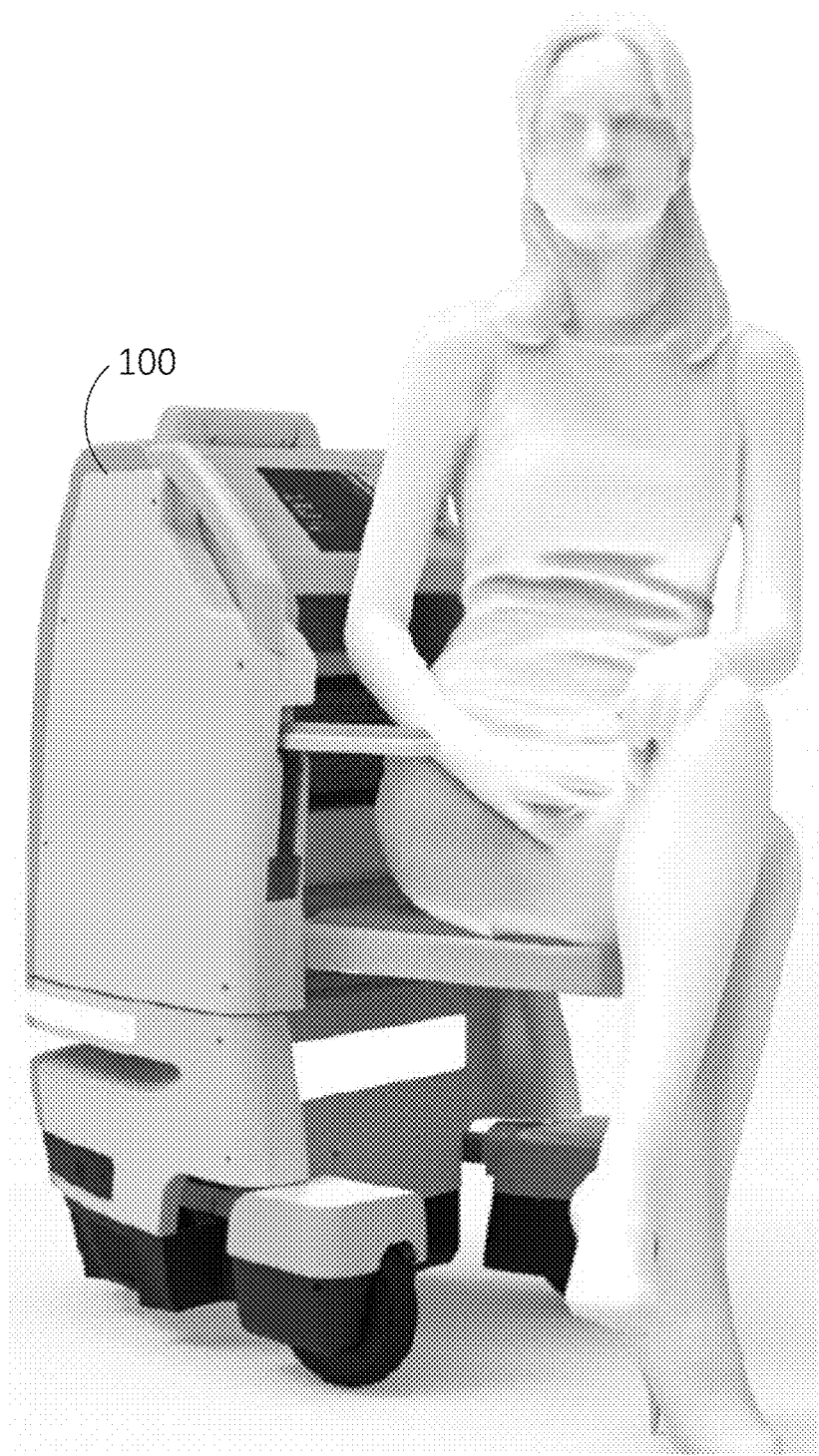
FIG. 10 is a schematic diagram showing the robotic walking assistant in a rest mode.

Referring to FIGS. 3-5, in one embodiment, the robotic walking assistant further includes a foldable seat 50 rotatably connected to the body 20 and disposed above the two wheels 122. The seat 50 is rotatable between a folded position (see FIGS. 1 and 9) and an unfolded position (see FIG. 10). In one embodiment, the body 20 may include a body casing 22 and an inner frame 23 that is arranged within the body casing 22 and fixed to the elevation mechanism 30. The inner frame 23 is a hollow cuboid frame and includes a number of vertical bars 231 and a number of horizontal bars 232 that are coupled to one another. The inner frame 23 defines a hollow space that allows the inner frame 23 to be arranged around and fixed to the upper housing 34 of the elevation mechanism 30. This arrangement allows the body 20 to move up and down together with the upper housing 34.

In one embodiment, the seat 50 may include a seat cover 51 and a seat body 52 arranged within the seat cover 51. The seat body 52 is a planar structure and substantially square. Two opposite sides of the seat body 52 are rotatably connected to the inner frame 23. In one embodiment, two angled bars 233 are connected to the inner frame 23 and located above the wheels 122. Each angled bar 233 includes a horizontal bar 2331 protruding from one vertical bar 231 of the inner frame 23, and a vertical bar 2332. Two seat mounting members 24 are respectively fixed to the vertical bars 2332, and each include a vertical tab 241. The opposite sides of the seat body 52 are rotatably connected to inner sides 2411 of the vertical tabs 241. With such configuration, the seat body 52 can be rotated to the folded position where the seat 50 is slightly inclined with respect to the body 20, and can be rotated to the unfolded position where the seat 50 is substantially perpendicular to the body 20.

In one embodiment, a seat motor 53 is fixed to the outer sides of one vertical tab 241, and is configured to actuate rotational movement of the seat body 52. The seat motor 53 can be a rotary DC motors that directly drives the seat body 52 to rotate. In another embodiment, a transmission mechanism can be arranged between the seat motor 53 and the seat body 52 to transmit rotary motion from the seat motor 53 to the seat body 52. In one embodiment, a limit switch may be arranged on the seat body 52 and the vertical tab 241. After the seat body 52 moves to the folded/unfolded positions, the limit switch is activated and the control system 40 stops rotation of the seat 50 according to signals from the limit switch. The limit switch may be mechanical, optical, or magnetic type limit switches. In one embodiment, a stop member may be fixed to the seat body 52, and a groove may be defined in the vertical tab 241 adjacent to the stop member. An end of the stop member is received in the groove and slide in the groove when the seat body 52 rotates. When the stop member comes into contact with one of the opposite ends of the groove, the rotation of the seat body 52 is stopped.

Referring to FIGS. 1, 3 and 4, in one embodiment, the robotic walking assistant 100 may further include two armrests 60 rotatably coupled to the inner frame 23 of the body 20. Two motor mounting members 25 are fixed to opposite sides of the inner frame 23, and two connecting members 26 are respectively fixed to the bottom surfaces of the motor mounting members 25. Two armrest mounting members 27 are respectively fixed to the connecting members 26. The armrest mounting members 27 are disposed above the two wheels 122 and at opposite sides of the seat body 52. Each armrest mounting members 27 may include a vertical tab 271, and the two armrests 60 are respectively rotatably coupled to the vertical tabs 271. Each armrest 60 is rotatable with respect to the body 20 between a folded position (see FIGS. 3, 4, and 9) and an unfolded position (see FIG. 10). In the folded positions, the armrests 60 may be substantially vertical or slightly inclined with the vertical direction. In the unfolded positions, the armrests 60 are substantially horizontal, which allows a user to put his/her hands on the two armrests 60.

In one embodiment, two actuator mounting members 28 are fixed to the inner frame 23 of the body 20 and the motor mounting members 25. The actuator mounting members 28 are disposed at opposite sides of the seat body 52, under the motor mounting members 25, and opposite the two armrests 60. Two linear actuators 61 are fixed to the actuator mounting members 28. In one embodiment, each linear actuator 61 may include a motor 62, a tube 63, and an output shaft 64 that is slidably connected to the tube 63. Via actuation of the motor 62, the output shaft 64 can slide with respect to the tube 63. The armrests 60 are respectively rotatably connected to the distal ends of the output shaft 64. When the output shafts 64 slide with respect to the tube 63, the armrests 60 are pushed by the output shafts 64 and can thus rotate with respect to the armrest mounting members 27.

Referring to FIGS. 3-5 and 8, in one embodiment, two handles 21 are employed. Each of the two handles 21 is slidable with respect to the body 20 between a retracted position (see FIGS. 8 and 10) and an extended position (see FIGS. 8 and 9). Each hand 21 may include a handle body 211, an upper bar 212, and a lower bar 213. The upper bar 212 and the lower bar 213 are fixed to the upper end and the lower end of the handle body 211. The upper bar 212 and the lower bar 213 are substantially parallel to each other. In one embodiment, two linear actuators 214 are respectively fixed to the motor mounting members 25. Each linear actuator 214 may include a motor 215, a slider 216, and a shaft 217. The slider 216 is slidable along the shaft 217. Via actuation of the motor 215, the shaft 217 rotates and the drives the slider 216 to move. One end of the lower bar 213 is fixed to the slider 216 of a corresponding linear actuator 214. The handles 21 are thus movable together with the sliders 216 of the linear actuators 214 between the retracted positions and the extended positions. When the wheel mechanisms 12 are moved to their extended positions, the handles 21 can be moved to their extended positions such that a user can remain upright while grabbing the handles 21.

Referring to FIGS. 1 and 4, in one embodiment, the robotic walking assistant 100 may further include a camera 71 rotatably mounted on a top of the body 20. The camera 71 can be an RGBD camera. Specifically, two support members 29 are fixed to the top of the inner frame 23 of the body 20. The support members 29 may be disposed in the vertical direction and spaced apart from each other. The camera 71 is arranged between and rotatably connected to the two support members 29. In one embodiment, the camera 71 extends in a direction that is substantially perpendicular to the two support members 29. The camera 71 is thus rotatably about an axis that is substantially perpendicular to the two support members 29. In another embodiment, the camera 71 may be rotatable about a vertical axis. In one embodiment, the robotic walking assistant 100 may further include a motor 711 to rotate the camera 71 to face forward to detect objects in front of the wheeled base 10, and rotate the camera 71 to face backward to detect a user at back of the wheeled base 10. The camera 71 can also detect fatigue and emotion status of a user. The robotic walking assistant can then perform an action according to the detection result. For example, the robotic walking assistant can alert the users after detection of fatigue of users. In one embodiment, a belt transmission mechanism may be used to transmit rotary motion from the motor 711 to the camera 71. Specifically, one end of the camera 71 may be provided with a first timing belt pulley 712, and a second timing belt pulley (not shown) is fixed to the output shaft of the motor 711. A timing belt is arranged around the first timing belt pulley 712 and the second timing belt pulley, which allows rotary motion to be transmitted from the motor 711 to the camera 71.

In one embodiment, the range of motion of the camera 71 can be set to 180 degrees. Since the camera 71 is rotatable and can move up and down together with the body 20, the camera can have a large field of view (FOV). In addition, a visual servoing algorithm could be adopted to enable the camera to track certain objects.

Figure 11:
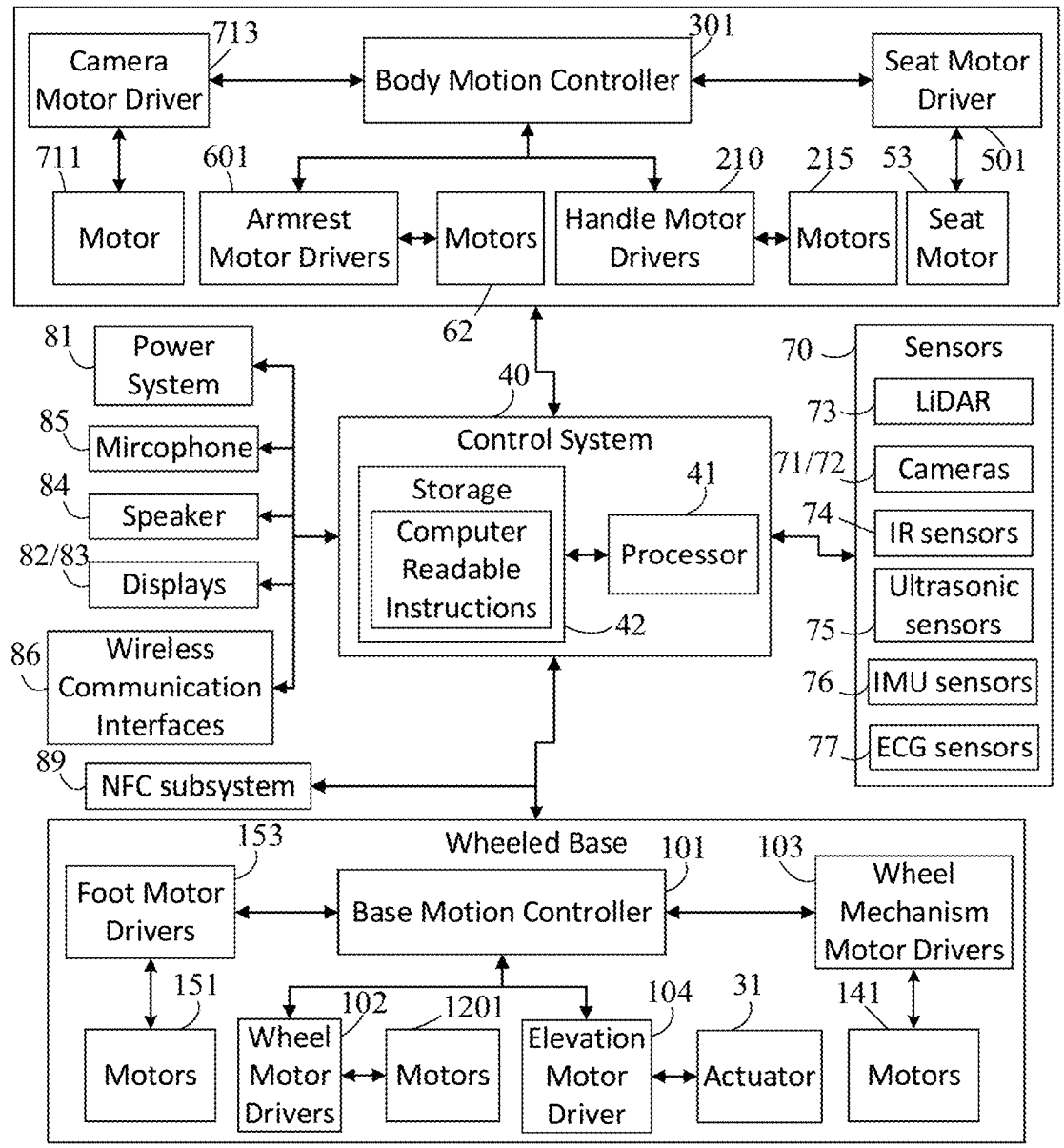
FIG. 11 is a schematic block diagram of the robotic walking assistant according to one embodiment.

Referring to FIG. 11, in one embodiment, the control system 40 includes a processor 41 and a storage 42 that stores computer readable instructions. The processor 41 runs or executes various software programs and/or sets of instructions stored in storage 42 to perform various functions for the robotic walking assistant 100 and to process data. The processor 41 may be a central processing unit (CPU), a general-purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general-purpose processor may be a microprocessor or any conventional processor or the like. The storage 42 may store software programs and/or sets of computer readable instructions and may include high-speed random-access memory and may include non-volatile memory, such as one or more magnetic disk storage devices, flash memory devices, or other non-volatile solid-state memory devices.

The robotic walking assistant 100 further includes a base motion controller 101 electrically connected to the processor 41, foot motor drivers 153, wheel motor drivers 102, wheel mechanism motor drivers 103, and an elevation motor driver 104 that are electrically connected to the base motion controller 101. The foot motor drivers 153 are configured to drive the motors 151 of the actuated feet 15. The wheel motor drivers 102 are configured to drive the motors 1201 that are configured to actuate rotational movement of the wheels 122. The wheel mechanism motor drivers 103 are configured to drive the motors 141 that are configured to actuate movement of the wheel mechanisms 12. The elevation motor driver 104 is configured to drive the motor 31 of the elevation mechanism 30.

The robotic walking assistant 100 further includes a body motion controller 301 electrically connected to the processor 41, a seat motor driver 501, a camera motor driver 713, armrest motor drivers 601, and handle motor drivers 210 that are electrically connected to the body motion controller 301. The seat motor driver 501 is configured to drive the seat motor 53 of the seat 50. The camera motor driver 713 is configured to drive the motor 711. The armrest motor drivers 601 are configured to drive the motors 62. The motor drivers 210 are configured to drive the motors 215.

Referring to FIGS. 1 and 11, in one embodiment, the robotic walking assistant 100 includes a number of sensors 70 including a 3D camera 72, a LiDAR sensor 73, a number of IR sensors 74, a number of ultrasonic sensors 75, and a number of IMU sensors 76. The camera 72 is disposed on the body casing 22 of the body 20. The IR sensors 74 and the ultrasonic sensors 75 are disposed on the base casing 111 of the wheeled base 10. The IMU sensors 76 are disposed on the wheeled base 10. The sensors 72 to 76 are configured to output data to the control system 40 such that the control system 40 can perform localization, motion planning, trajectory tracking control and obstacle avoidance for the robotic walking assistant 100. In one embodiment, electrocardiogram (ECG) sensors 77 may be imbedded in the handles 21 to measure the heartbeat of the user holding the handles 21. It should be noted that the robotic walking assistant 100 may have more sensors than shown.

In one embodiment, the robotic walking assistant 100 further includes a power system 81 that powers all key components of the robotic walking assistant 100. The power system 81 is mounted in the base 10, and may include a battery management system (BMS), one or more power sources (e.g., battery, alternating current (AC)), a recharging system, a power failure detection circuit, a power converter or inverter, a power status indicator (e.g., a light-emitting diode (LED)) and any other components associated with the generation, management and distribution of electrical power. The power system 81 may further include a self-charging unit that can be engaged with a docking charging station in a fixed location, which allows the robotic walking assistant 100 to be charged. The battery management system manages a rechargeable battery, such as by protecting the battery from operating outside its safe operating area, monitoring its state, calculating secondary data, reporting that data, controlling its environment, authenticating it and/or balancing it.

In one embodiment, the robotic walking assistant 100 may further include a front display 82 and a rear display 83. The front display 82 and the rear display 83 may be a touch-sensitive display device and each provide an input interface and an output interface between the robotic walking assistant robot 100 and a user. The front display 82 and the rear display 83 display visual output to the user. The visual output may include graphics, text, icons, video, and any combination thereof. In one embodiment, the front display 82 faces the front of the robotic walking assistant 100 to display general information, or allow telepresence of a user who is not actively using the walking function. The rear display 83 can display the walking related information.

In one embodiment, the robotic walking assistant 100 may further include a speaker 84 and a microphone 85 that provide an audio interface between a user and the robotic walking assistant 100. The microphone 85 receives audio data, converts the audio data to an electrical signal that is transmitted as a command to the control system 40. The speaker 84 converts the electrical signal to human-audible sound waves. The speaker 84 and the microphone 85 enable voice interaction between a user and the robotic walking assistant. The speaker 84 may play music or other audio contents to users for entertainment purpose. The robotic walking assistant 100 may further include wireless communication interfaces 86, such as WIFI and BLUETOOTH modules. The robotic walking assistant 100 may further include wireless communication interfaces 86, such as WIFI and BLUETOOTH modules. The robotic walking assistant 100 may further include an NFC subsystem 89 that may include an NFC chip and an antenna that communicates with another device/tag, which allows the NFC subsystem 89 to have an NFC reading function. The NFC subsystem 89 can be used for authorization purpose. That is, the NFC subsystem 89 can serve as a security mechanism to determine user privileges or access levels related to system resources.

It should be noted that FIG. 11 shows only one example of the robotic walking assistant 100, and that the robotic walking assistant 100 may have more or fewer components than shown, may combine two or more components, or may have a different configuration or arrangement of the components. For example, the robotic walking assistant 100 may include a front light band 87 and a rear light band 88 (see FIG. 1) to illuminate the path for a user when the environment is dark. The robotic walking assistant 100 may include a storage unit for storing items such that the robotic walking assistant 100 can deliver the items to a desired location. The various components shown in FIG. 11 may be implemented in hardware, software or a combination of both hardware and software, including one or more signal processing and/or application specific integrated circuits.

Figure 12:
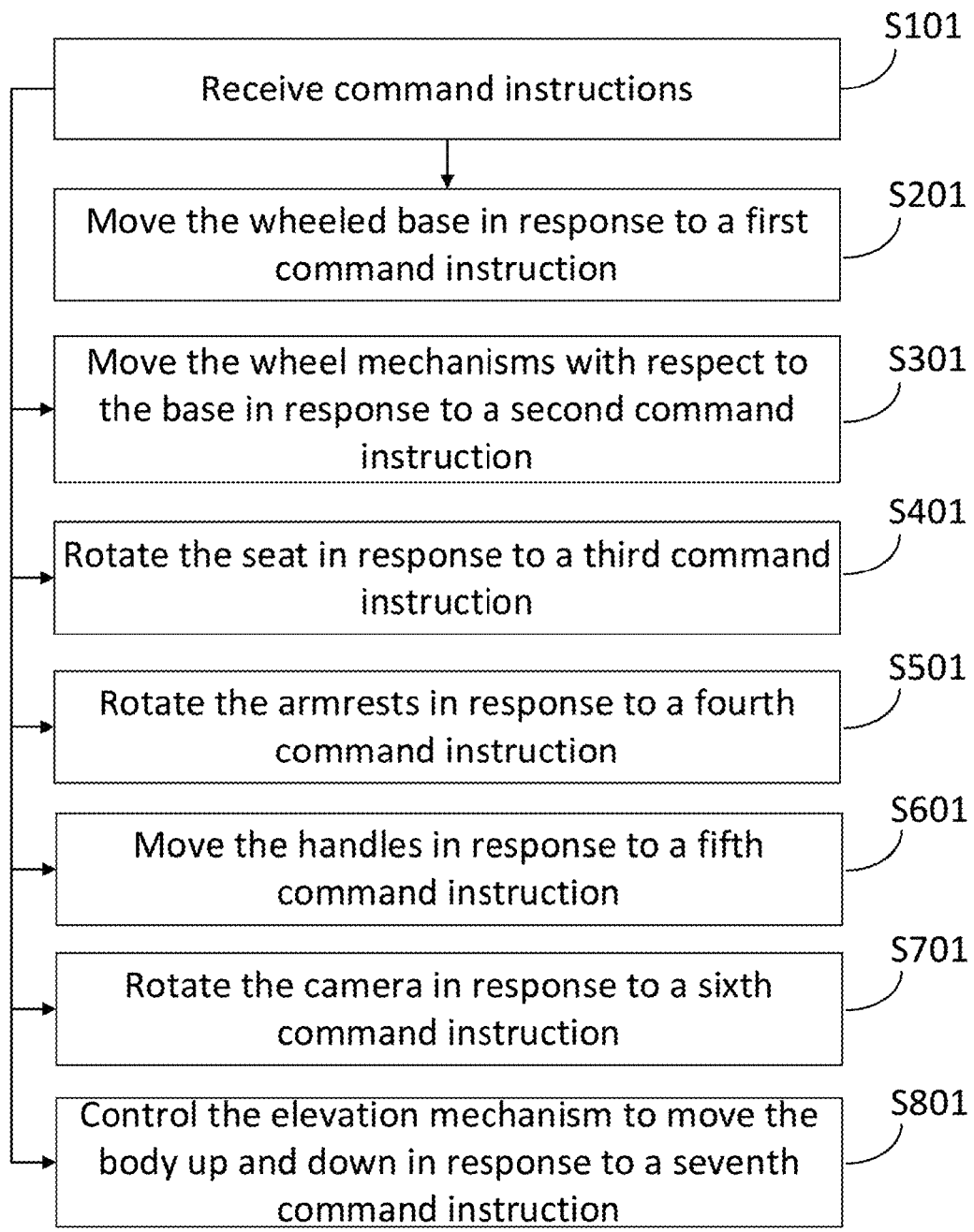
FIG. 12 is a schematic flowchart of a method for controlling the robotic walking assistant according to one embodiment.

FIG. 12 is a flowchart illustrating a method of controlling the robotic walking assistant 100 according to one embodiment, which includes the following steps. It should be noted that the order of the steps as shown in FIG. 12 is not limited and can change according to actual needs. For example, after switching the robotic walking assistant 100 to a walking assistive mode, the processor 41 may first move the handles 21 and the control the elevation mechanism 30 to move the body 20 up to a determined height so as to adapt to different users with various heights and arm length. However, after the robotic walking assistant 100 in an autonomous mode receives a command instruction to deliver an item, the processor 41 may first move the wheeled base 10 to a determined location.

Step S101: Receive command instructions. The processor 41 of the control system 40 receives command instructions. For example, the processor 41 may receive a command instruction from a user (e.g., care seeker) that request the robotic walking assistant 100 to fetch an object from one location and deliver the object to another location.

Step S201: Move the wheeled base 10 in response to a first command instruction. The processor 41 may analyze each command instruction and move the wheeled base 10 to a determined location in response to a first command instruction. The first command instruction may include descriptions of locations where the robotic walking assistant 100 needs to reach. For example, when a user (e.g., care seeker) requests the robotic walking assistant 100 to fetch and deliver an object, the first command instruction may include descriptions of a starting location where the object is stored and a target location where the object needs to be delivered. The processor 41 may execute software programs and/or sets of instructions stored in storage 42 to perform localization, motion planning, and trajectory tracking such that the wheeled base 10 can determine its real-time position in a known map during movement along a planned path. If there is a dynamic obstacle on the planned path, the processor 41 can plan a new path to avoid the obstacle. In other words, the wheels 122 may be controlled to follow a prescribed path which will be adjusted if there are obstacles on the path. The wheeled base 10 can autonomously move first to the starting location and then to the target location. Additionally, the wheels 122 can be controlled with command on the screen or control inputs inferred from the handles, which could be attached with load cells. This allows a user to directly control movement of the wheels 122.

Step S301: Move the wheel mechanisms 12 with respect to the base 11 in response to a second command instruction. The processor 41 may analyze each command instruction and move the wheel mechanisms 12 to the retracted positions or the extended positions according to the second command instruction. The processor 41 may receive the second command instruction from a user (e.g., care seeker) to move the wheel mechanisms 12 to the extended positions such that the user can grab the handles 21 and push the robotic walking assistant 100, or the user can sit on the seat 50. Additionally, the processor 41 may move the wheel mechanisms 12 to the retracted positions when certain conditions are met, for example when the robotic walking assistant 100 moves to the determined position and there is no further physical task.

Step S401: Rotate the seat 50 in response to a third command instruction. The processor 41 may analyze each command instruction and rotate the seat 50 to the folded or unfolded position according to the third command instruction. The processor 41 may receive the third command instruction from a user (e.g., care seeker) to rotate the seat 50 to the unfolded position such that the user can sit on the seat 50. The processor 41 may receive the third command instruction from the user to rotate the seat 50 back to the folded position such that the robotic walking assistant 100 is ready to be pushed by the user. Additionally, the processor 41 may rotate the seat 50 when certain conditions are met. For example, when the processor 41 determines that the user is tired according to the output from camera 71, the processor 41 can rotate the seat 50 to the unfolded position such that the user can sit on the seat 50.

Step S501: Rotate the armrests 60 in response to a fourth command instruction. The processor 41 may analyze each command instruction and rotate the armrests 60 to the folded or unfolded positions according to the fourth command instruction. The processor 41 may receive the fourth command instruction from a user (e.g., care seeker) to rotate the armrests 60 to the unfolded positions such that the user can put his/her arms on the armrests 60 when the user sits on the seat 50. Additionally, the processor 41 may rotate the armrests 60 when certain conditions are met. For example, when the seat 50 has been rotated to the unfolded position, the processor 41 rotates the armrests 60 to the unfolded positions; when the seat 50 has been rotated to the folded position, the processor 41 rotates the armrests 60 to the folded positions. The arm rests 60 and the seat 50 can be rotated simultaneously to their folded positions or unfolded positions. However, they can be controlled to rotate separately when needed.

Step S601: Move the handles 21 in response to a fifth command instruction. The processor 41 may analyze each command instruction and move the handles 21 according to the fifth command instruction. The processor 41 may receive the fifth command instruction from a user (e.g., care seeker) to move the handles 21 to the extended positions such that the user can grab the handles 21 to push the robotic walking assistant 100 while walking. Additionally, the processor 41 may move the handles 21 when certain conditions are met. For example, when the wheel mechanisms 12 are move to their extended positions, the processor 41 moves the handles 21 to the extended positions; when the wheel mechanisms 12 are move to their retracted positions, the processor 41 moves the handles 21 to their retracted positions.

Step S701: Rotate the camera 71 in response to a sixth command instruction. The processor 41 may analyze each command instruction and rotate the camera 71 according to the sixth command instruction. For example, the processor 41 may receive a command instruction from a user (e.g., care seeker) and control the robotic walking assistant 100 to move autonomously between determined positions. In this scenario, the processor 41 rotates the camera 71 to face forward to detect objects in front of the robotic walking assistant 100 such that the robotic walking assistant 100 can perceive the environment. The processor 41 may receive a command instruction from a user (e.g., care seeker) who requests the robotic walking assistant 100 to provide assistance when the user is walking, the processor 41 rotates the camera 71 to face backward to detect the facial expressions or other bio-characters of the user. As a result, the robotic walking assistant 100 can monitor the tiredness of the user.

Step S801: Control the elevation mechanism 30 to move the body 20 up and down in response to a seventh command instruction. The processor 41 may analyze each command instruction and control the elevation mechanism 30 to move the body 20 up and down in response to the seventh command instruction. For example, the processor 41 may receive a command instruction from a user (e.g., care seeker) and control the robotic walking assistant 100 to move autonomously between determined positions. In this scenario, the processor 41 control the elevation mechanism 30 to move the body 20 down to the retracted position such that the robotic walking assistant 100 can have a limited height, which facilitates stability during movement and travel of the robotic walking assistant 100. The processor 41 may receive a command instruction from a user (e.g., care seeker) who requests the robotic walking assistant 100 to provide assistance when the user is walking, the processor 41 can then determine the height of the user can move the body 20 up to an extended position according to the height of the user. In this scenario, the extended position is not a fixed position and may change depending on the height of the user. With such configuration, the robotic walking assistant 100 can have the flexibility to adapt to different users of different height, which allows different users to walk and push the robotic walking assistant 100 in a substantially upright pose.

Figure 13:
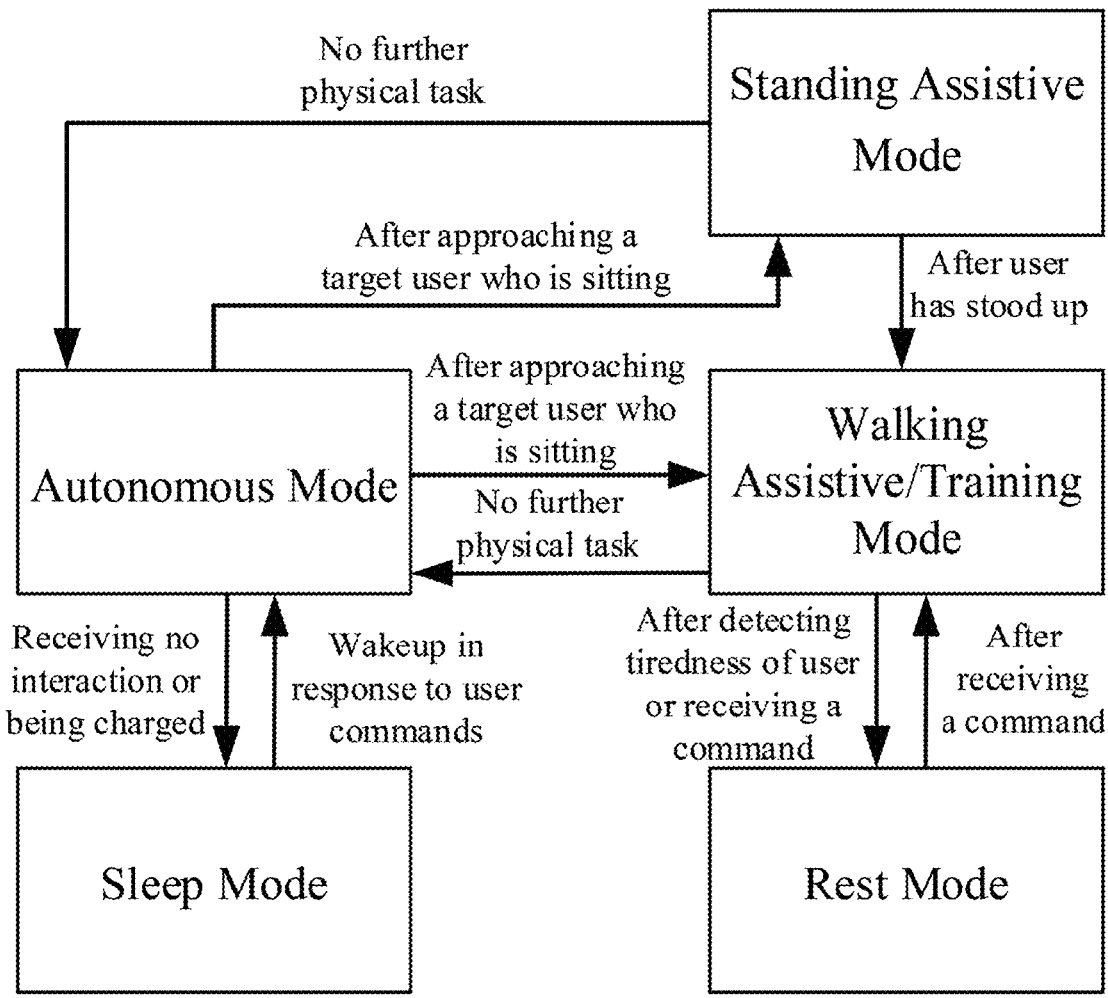
FIG. 13 is a schematic diagram showing the working modes of the robotic walking assistant according to one embodiment.

In one embodiment, the robotic walking assistant 100 can operate in different modes. For example, as shown in FIG. 13, the robotic walking assistant 100 can operate in a first mode or autonomous mode. In this mode, control system 40 can perform localization, motion planning, trajectory tracking control and obstacle avoidance based on the data outputted by the sensors 72 to 76, which allows the robotic walking assistant 100 to move autonomously between a starting location and a target location so as to achieve an assigned task. In response to an autonomous mode, the wheel mechanisms 12 are moved to their retracted positions, the feet 152 are moved up away from the surface S, the body 20 is moved down to its retracted position, the seat 50 and the armrests 60 are rotated to their folded positions, the handles 21 are moved to their retracted positions, and the camera 71 is rotated to face forward. The robotic walking assistant 100 can operate in a second mode or sleep mode. In this mode, robotic walking assistant 100 goes into a low power state and remains that way. When the robotic walking assistant 100 in the first mode receives no user input for a preset time period (e.g., 10 minutes) or the robotic walking assistant 100 is charged, the robotic walking assistant 100 is switched to the second mode. The robotic walking assistant 100 can be switched to the first mode after receiving a command from the user, such as a voice command, a touch on the display 82, etc.

The robotic walking assistant 100 can operate in a third mode or standing assistive mode. In this mode, the wheel mechanisms 12 and the handles 21 are moved to their extended positions, which enables the robotic walking assistant 100 to serve as a stable structure where the user can grab the handles 21 and stand up from a sitting position. After the robotic walking assistant 100 in the first mode approaches the user who is sitting, the robotic walking assistant 100 can be switched to the third mode. When there is no physical task, the robotic walking assistant 100 in the third mode can be switched to the first mode. The robotic walking assistant 100 can operate in a fourth mode or walking assistive mode. In response to a walking assistive mode command instruction, the wheel mechanism 12 and the handles 21 are moved to their extended positions, the feet 152 are moved up away from the surface S, and the body 20 is moved up to an extended position according to the height of the user. In this mode, the robotic walking assistant 100 is ready to be pushed by the user and helps support a portion of the bodyweight of the user when the user is walking. After the robotic walking assistant 100 in the first mode approaches the user who is standing, the robotic walking assistant 100 can be switched to the fourth mode. When there is no physical task, the robotic walking assistant 100 in the fourth mode can be switched to the first mode.

The robotic walking assistant 100 can operate in a fifth mode or walking training mode. In response to a walking training mode command instruction, the wheel mechanism 12 and the handles 21 are moved to their extended positions, the feet 152 are moved up away from the surface S. and the body 20 is moved up to an extended position according to the height of the user. In this mode, the robotic walking assistant 100 is ready to be pushed by the user and helps support a portion of the bodyweight of the user when the user is walking. After the robotic walking assistant 100 in the first mode approaches the user who is standing, the robotic walking assistant 100 can be switched to the fifth mode. When there is no physical task, the robotic walking assistant 100 in the fifth mode can be switched to the first mode. The difference between the walking training mode and the walking assistive mode is that the robotic walking assistant 100 in the walking training mode can exert extra resistance to the user so that he/she has to make extra efforts to push the robotic walking assistant forward or around, thus increasing the muscle strength and coordination capability given enough training sessions. In one embodiment, the wheeled base 10 may further include brakes. When then robotic walking assistant is switched to the walking training mode, the processor 41 controls the brakes to press against the moving wheels 122 to create friction. In this case, the user needs to apply more pushing force to the robotic walking assistant 100, thereby increasing the muscle strength and coordination capability given enough training sessions.

The robotic walking assistant 100 can operate in a sixth mode or rest mode. In response to a rest mode command instruction, the wheel mechanisms 12 are moved to their extended positions, the feet 152 are moved down to be in contact with the surface S, and the seat 50 and the armrests 60 are rotated to their unfolded positions. The robotic walking assistant 100 is thus ready for the user to take a seat for rest. The robotic walking assistant 100 in the fourth mode can be switched to the sixth mode after receiving a command from the user or detecting that the user is tired. The robotic walking assistant 100 in the sixth mode can be switched to the fourth mode after receiving a command from the user. It should be noted that FIG. 13 shows only one example of the working modes of the robotic walking assistant 100, and that the robotic walking assistant 100 may have more working modes than shown.

Figure 14:
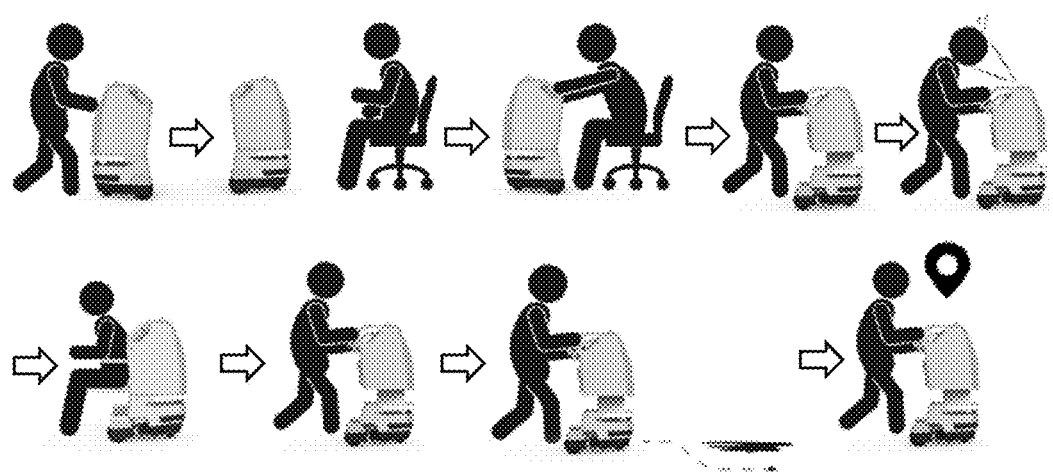
FIG. 14 shows exemplary scenarios when the robotic walking assistant operates to provide walking assistance/training to a user.

FIG. 14 show nine exemplary scenarios when the robotic walking assistant 100 operates to provide walking assistance/training to a user. Specifically, the first scenario shows that the robotic walking assistant 100 receives a schedule from a user (e.g., a care seeker or a patient). The schedule may include descriptions of start time of walk, duration of walk, starting location, destination location, walking route, and the like. The front display 82 displays walk planning user interfaces that allow the user to directly create the schedule on the robotic walking assistant 100. In another embodiment, the robotic walking assistant 100 may receive, through a wireless or wired connection, the schedule that is created on a computing device, such as a cell phone, a lap computer, a desktop computer, and the like. In yet another embodiment, when the robotic walking assistant 100 is employed in a healthcare facility, an elderly care facility, or an assisted living facility that includes a central platform managing the robotic walking assistant 100, the robotic walking assistant 100 may receive the schedule that is created by a healthcare professional from the central platform. The second scenario shows that the robotic walking assistant 100 finds the user (e.g., a care seeker or a patient) at the time and location specified by the schedule. The third scenario shows that the robotic walking assistant 100 approaches the user and is switched to the standing assistive mode to help the user who is sitting on a chair to stand up. The fourth scenario shows that the robotic walking assistant 100 is switched to the walking assistive mode to provide walking assistance to the user. The fifth scenario shows that the robotic walking assistant 100 alters the user when fatigue behavior is detected according to the outputs from the camera 71. The alert may be visual or audio.

The sixth scenario shows that the walking assistant 100 is switched to the rest mode such that the user can sit on the seat 50. The seventh scenario shows that the robotic walking assistant 100 continues to escort the user toward the destination after the user takes a break. The eighth scenario shows that the walking assistant 100 has detected obstacles/hazards in front of the walking assistant 100, and guides the user to walk around the obstacles/hazards. The walking assistant 100 may report the obstacles/hazards to the central platform. The seventh scenario shows that the robotic walking assistant 100 continues to escort the user until they reach the planned destination.

Figure 15:
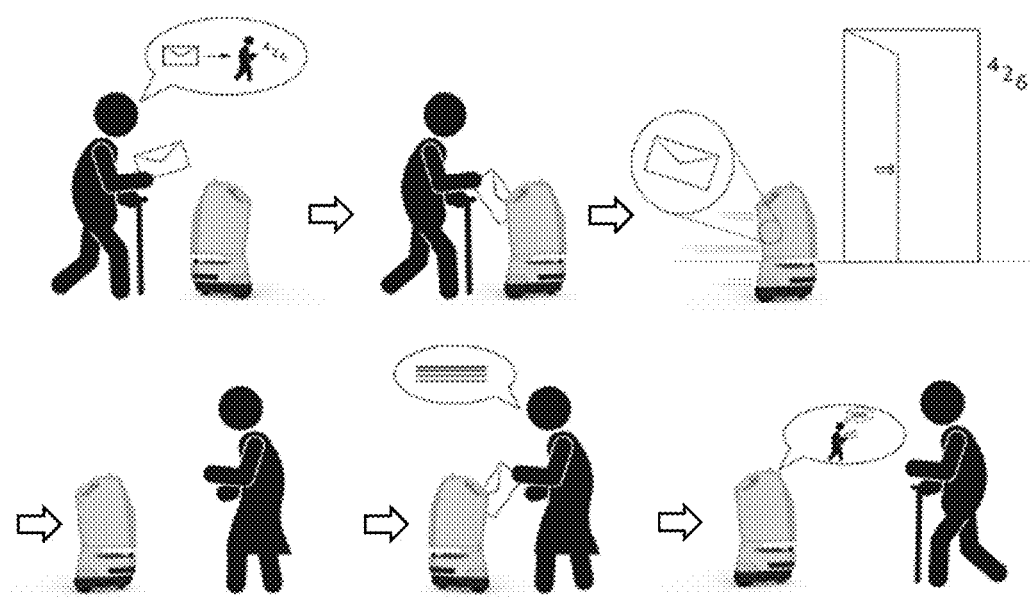
FIG. 15 shows exemplary scenarios when the robotic walking assistant operates in the autonomous mode.

FIG. 15 shows exemplary scenarios when the robotic walking assistant operates in the autonomous mode in a facility, such as a healthcare facility, an elderly care facility, or an assisted living facility. The first and second scenarios show that the robotic walking assistant 100 receives a request from a first user (e.g., a healthcare professional) to deliver an item to a second user (e.g., a care seeker or a patient). In this case, the robotic walking assistant 100 may include a storage unit in the body 20 to store items, such as books, letters, prescription medicines, etc. The front display 82 may display a user interface that allow input of information about the second user, such as location of the second user. The third scenario shows that the robotic walking assistant 100 move autonomously toward the location of the second user. The third scenario shows that the robotic walking assistant 100 reaches the location of the second user, and notifies the second user of the delivered item from the first user. The fifth scenario shows that the second user retrieves the delivered item and the robotic walking assistant 100 may record an audio message or a video message of the second user. The sixth scenario shows that the robotic walking assistant 100 moves autonomously to the first user and notifies the first user of completed delivery of the item and playback the audio message or video message from the second user.

Figure 16:
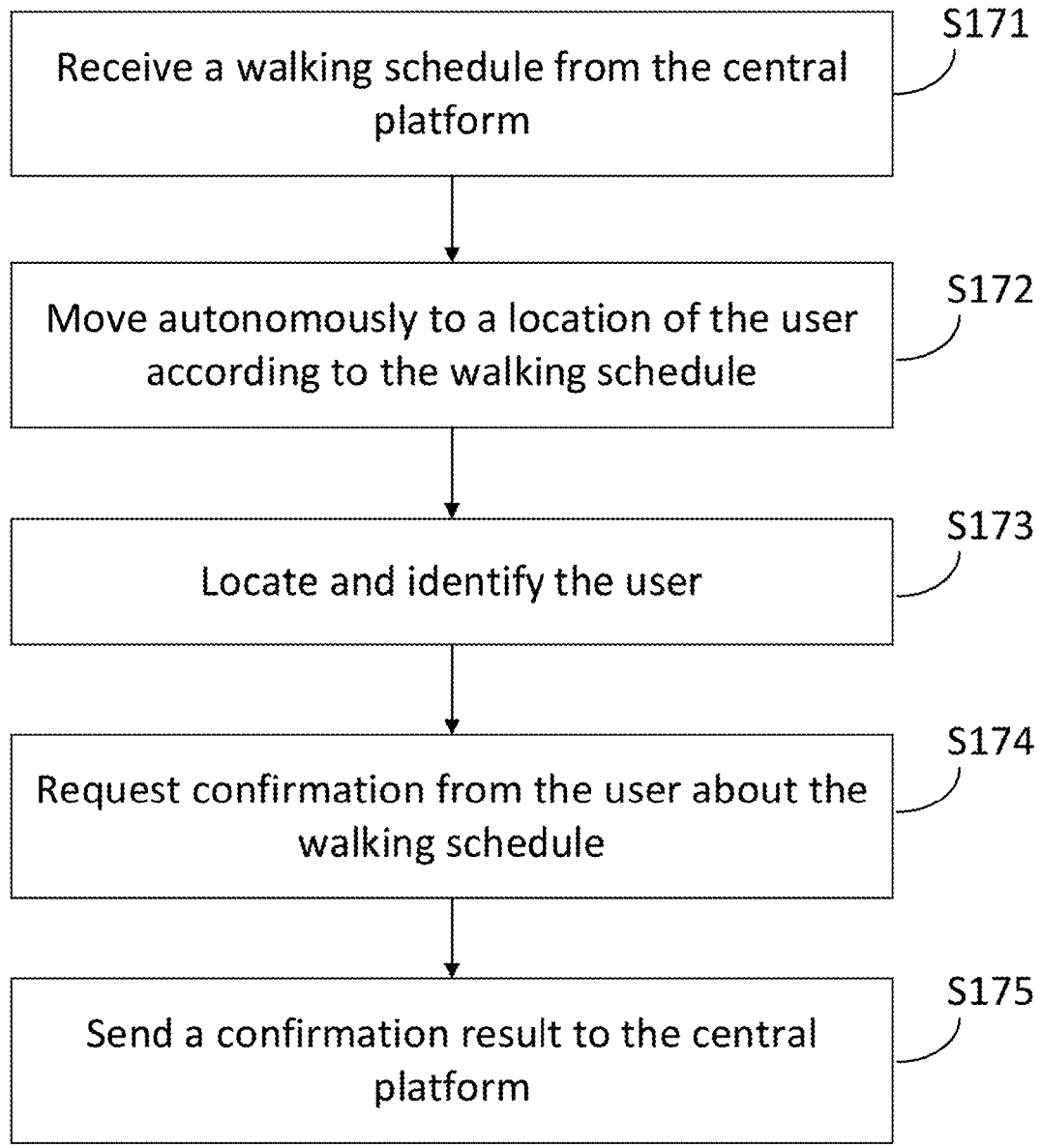
FIG. 16 is a flowchart illustrating a method of creating a walking schedule according to one embodiment.

FIG. 16 is an exemplary flowchart illustrating a method for controlling the robotic walking assistant receiving a walking schedule from a central platform, which includes the following steps. The central platform refers to a platform of a facility, such as a healthcare facility, an elderly care facility, or an assisted living facility. The central platform may include a number of user interfaces generated by an application. The user interfaces show information of all the tasks that is being performed or ready to be performed by one or more robotic walking assistants. The application will be ideal for healthcare managers or administrators to access the most data-rich user interfaces with full visibility of the overall operation. From prioritization to authorization, full control is centralized for the most efficient workflows. All these user interfaces enable care providers with functions required for "smart logistics," which includes responding to requests, optimizing task schedule, identifying optimized routes, etc.

Step S171: Receive a walking schedule from the central platform. The processor 41 of the control system 40 receives the walking schedule from the central platform. In one embodiment, the walking schedule is created on the central platform by a healthcare professional. The schedule may include descriptions of start time of walk, duration of walk, starting location, destination location, walking route, location of the user, identifying information of the user, and the like.

Step S172: Move autonomously to a location of the user (e.g., a care seeker or a patient) according to the walking schedule. After step S171, the robotic walking assistant 100 is switched to the autonomous mode and move toward the location of the user specified in the walking schedule.

Step S173: Locate and identify the user. In one embodiment, the robotic walking assistant 100 may locate and identify the user using face recognition technology.

Step S174: Request confirmation from the user about the walking schedule. The robotic walking assistant 100 may display the walking schedule on the front display 82, and may read out the walking schedule. The robotic walking assistant 100 may further provide one or more user interfaces for the user to accept or modify the walking schedule.

Step S175: Send a confirmation result to the central platform. After the user accepts or modifies the walking schedule, the robotic walking assistant 100 sends the confirmation result to the central platform.

Figure 17:
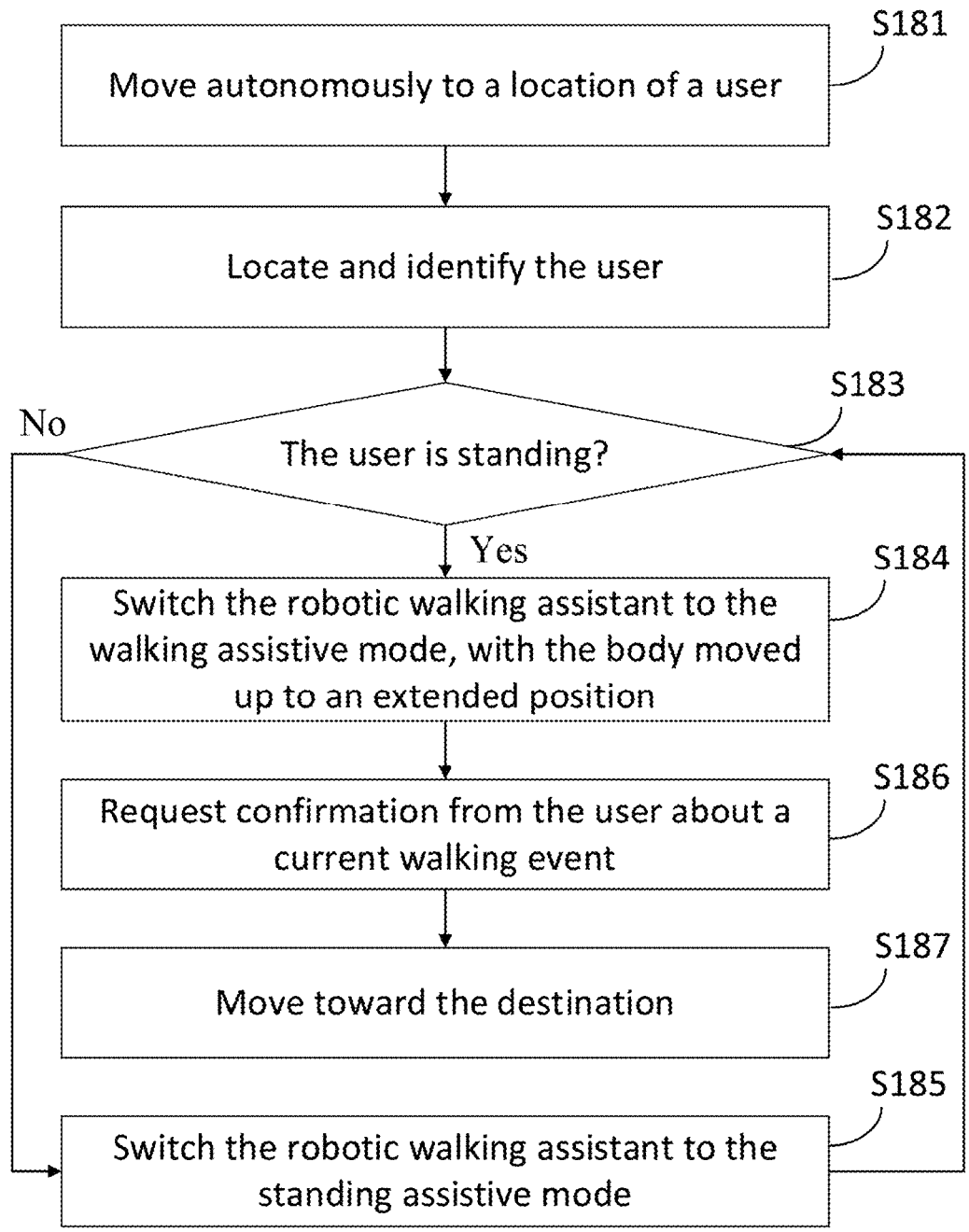
FIG. 17 is a schematic flowchart of a method for controlling the robotic walking assistant according to one embodiment.

FIG. 17 is a flowchart illustrating a method of controlling the robotic walking assistant 100 according to one embodiment, which includes the following steps.

Step S181: Move autonomously to a location of a user. In one embodiment, the robotic walking assistant 100 may move autonomously to the location of the user according to a pre-planned walking schedule or in response to command instruction from the user.

Step S182: Locate and identify the user. In one embodiment, the robotic walking assistant 100 may locate and identify the user using face recognition technology.

Step S183: Determine whether the user is standing. If the user is standing, the procedure goes to step S184.

Step S184: Switch the robotic walking assistant 100 to the walking assistive mode, with the body 20 moved up to an extended position. In one embodiment, the robotic walking assistant 100 may receive a user profile that includes the height of the user from the central platform. The body 20 may be moved up to the extended position according to the height of the user such that the handles 21 are at a comfortable height for the user. The robotic walking assistant 100 may further provide a user interfaces for the user to adjust the height of the handles 21. In this case, the processor 41 may control the elevation mechanism 30 to move the body 20 up/down according to a height value inputted by the user.

Step S186: Request confirmation from the user about a current walking event. In one embodiment, the walking schedule may include a number of walking events, and the robotic walking assistant 100 may determine a current walking event corresponding to the current time. The walking event may include descriptions of a destination, a walking route, duration of walk, etc. In another embodiment, the robotic walking assistant 100 may plan a walking route according to the destination specified in the walking schedule. The robotic walking assistant 100 may display the destination, the planned walking route, walking speed, and duration of walk on the first display. The robotic walking assistant 100 may further provide one or more user interfaces for the user to accept or modify the displayed parameters.

Step S187: Move toward the destination. After the user confirms or modifies the current walking event, the robotic walking assistant 100 escorts the user and moves toward the destination according to the accepted/modified walking event. In one embodiment, the robotic walking assistant 100 can move autonomously and guide the user to walk along a planned path toward the destination. In another embodiment, the robotic walking assistant 100 moves only when being pushed/pulled by the user. In this case, the rear display 83 may display navigation information to guide the user to walk along a planned path toward the destination.

If the user is not standing, the procedure goes to step S185. Step S185: Switch the robotic walking assistant 100 to the standing assistive mode. In this mode, the robotic walking assistant 100 can help the user to stand up. The procedure then goes to Step S184.

It should be appreciated the above disclosure detailed several embodiments of the robotic walking assistant 100 that can provide walking assistance and fall prevention. As mentioned above, the robotic walking assistant 100 can be employed in assisted living facilities or healthcare facilities. However, the disclosure is not limited thereto. In other exemplary usage scenarios, the robotic walking assistant 100 may be used in hospitals.

With the configuration described above, the robotic walking assistant can promote an active living life style for the elderly people. The robotic walking assistant can allow them to do more exercise to maintain their mobility capability. Moving around also provide more chances for the elderly people to interact with other people (particularly in the elderly care facility or assistive living facility) so that they feel less isolated. The robotic walking assistant also has features to prevent the falling. For instance, the robotic walking assistant will issue tripping hazard signal to the elderly people if it detects a water puddle or a slipper on the way.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A robotic walking assistant, comprising:
 a wheeled base comprising a base and one or more position adjustable wheels connected to the base, each of the one or more wheels slidable with respect to the base between a retracted position and an extended position in a direction that is substantially parallel to a surface where the wheeled base moves;
 a body disposed in a vertical direction, positioned on the wheeled base, and having at least one handle;
 one or more actuated feet connected to the base; and
 a control system that receives command instructions;
 wherein in response to a rest mode command instruction, the control system is configured to move the one or more wheels to the extended position and to direct the one or more actuated feet to move down to be in contact with the surface;
 wherein in response to a walking assistive mode command instruction, the control system is configured to move the one or more wheels to the extended position and to direct the one or more actuated feet to move up away from the surface; and
 wherein in response to an autonomous mode command instruction, the control system is configured to move the one or more wheels to the retracted position and to direct the one or more actuated feet to move up away from the surface.

2. The robotic walking assistant of claim 1, wherein the one or more wheels are slidable with respect to the base along a direction that is outwardly inclined with respect to a moving direction of the wheeled base.

3. The robotic walking assistant of claim 1, further comprising one or more linear actuators, wherein the one or more linear actuators are fixed to the base and configured to drive the one or more position adjustable wheels to move between the retracted position and the extended position.

4. The robotic walking assistant of claim 1, further comprising a foldable seat rotatably connected to the body, wherein the control system directs the foldable seat to rotate between a folded position and an unfolded position.

5. The robotic walking assistant of claim 1, further comprising a camera rotatably mounted on a top of the body, wherein the control system directs the camera to face forward to detect objects in front of the wheeled base, and directs the camera to face backward to detect a user at back of the wheeled base.

6. The robotic walking assistant of claim 1, wherein the at least one handle is slidable with respect to the body.

7. A robotic walking assistant, comprising:
   a wheeled base comprising a base and one or more wheels that are movably and rotatably mounted on the base, the one or more wheels configured to move with respect to the base to form different sets of support points at different positions of a surface where the wheeled base moves;
   a body disposed in a vertical direction and having at least one handle;
   an elevation mechanism positioned on the wheeled base, the elevation mechanism configured to move the body up and down; and
   one or more actuated feet that are connected to the base, the one or more actuated feet movable up and down in a vertical direction;
   wherein in response to a rest mode command instruction, the one or more wheels are configured to move to first positions and the one or more actuated feet are configured to move down to be in contact with a surface where the wheeled base moves;
   wherein in response to a walking assistive mode command instruction, the one or more wheels are configured to move to the first positions and the one or more actuated feet are configured to move up away from the surface; and
   wherein in response to an autonomous mode command instruction, the one or more wheels are configured to move to second positions and the one or more actuated feet are configured to move up away from the surface.

8. The robotic walking assistant of claim 7, wherein the one or more wheels are slidable with respect to the base along a direction that is outwardly inclined with respect to a moving direction of the wheeled base.

9. The robotic walking assistant of claim 7, further comprising one or more linear actuators, wherein the one or more linear actuators are fixed to the base and configured to drive the one or more position adjustable wheels to move with respect to the base.

10. The robotic walking assistant of claim 7, further comprising a foldable seat rotatably connected to the body, wherein the foldable seat is rotatable between a folded position and an unfolded position.

11. The robotic walking assistant of claim 7, wherein the elevation mechanism comprises an actuator and a lifting mechanism, the lifting mechanism is connected to the body and the wheeled base, and the actuator is fixed to the wheeled base and configured to drive the lifting mechanism to elongate or retract in a vertical direction.

12. The robotic walking assistant of claim 7, further comprising a camera rotatably mounted on a top of the body, wherein the camera is rotatable to a position where the camera faces forward to detect objects in front of the wheeled base, and the camera is rotatable to a position where the camera faces backward to detect a user at back of the wheeled base.

13. The robotic walking assistant of claim 7, wherein the at least one handle is slidable with respect to the body.

14. A robotic walking assistant, comprising:
   a wheeled base comprising a base, one or more first wheels rotatably connected to the base, and one or more second wheels movably and rotatably connected to the base, the one or more second wheels slidable with respect to the base to form adjustable distances between the one or more first wheels and one or more second wheels;
   an elongated body having at least one handle;
   one or more actuated feet that are connected to the base; and
   an elevation mechanism positioned on the wheeled base, the elevation mechanism configured to move the body up and down;
   wherein in response to a rest mode command instruction, the one or more wheels are configured to move to first positions and the one or more actuated feet are configured to move down to be in contact with a surface where the wheeled base moves;
   wherein in response to a walking assistive mode, the one or more wheels are configured to move to the first positions and the one or more actuated feet are configured to move up away from the surface; and
   wherein in response to an autonomous mode command instruction, the one or more wheels are configured to move to second positions and the one or more actuated feet are configured to move up away from the surface.

15. The robotic walking assistant of claim 14, wherein the one or more second wheels are slidable with respect to the base along a direction that is outwardly inclined with respect to a moving direction of the wheeled base.

16. The robotic walking assistant of claim 14, further comprising one or more linear actuators, wherein the one or more linear actuators are fixed to the base and configured to drive the one or more second wheels to move with respect to the base.

17. The robotic walking assistant of claim 14, further comprising a foldable seat rotatably connected to the body, wherein the foldable seat is rotatable between a folded position and an unfolded position.

18. The robotic walking assistant of claim 14, wherein the elevation mechanism comprises an actuator and a lifting mechanism, the lifting mechanism is connected to the body and the wheeled base, and the actuator is fixed to the wheeled base and configured to drive the lifting mechanism to elongate or retract in a vertical direction.

19. The robotic walking assistant of claim 14, further comprising a camera rotatably mounted on a top of the body, wherein the camera is rotatable to a position where the camera faces forward to detect objects in front of the wheeled base, and the camera is rotatable to a position where the camera faces backward to detect a user at back of the wheeled base.

20. The robotic walking assistant of claim 14, wherein the at least one handle is slidable with respect to the body.

* * * * *